(12) United States Patent
Legendre et al.

(10) Patent No.: US 12,410,698 B2
(45) Date of Patent: Sep. 9, 2025

(54) FRACTURE CHARACTERIZATION WHILE DRILLING

(71) Applicant: SCHLUMBERGER TECHNOLOGY CORPORATION, Sugar Land, TX (US)

(72) Inventors: Emmanuel Legendre, Clamart (FR); Fabienne Legendre, Clamart (FR); Alexandre Abellan, Clamart (FR); Martin G. Luling, Clamart (FR); Carlos Jeronimo Maeso, Galashiels (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 19/102,866

(22) PCT Filed: Aug. 14, 2023

(86) PCT No.: PCT/US2023/072138
§ 371 (c)(1),
(2) Date: Feb. 11, 2025

(87) PCT Pub. No.: WO2024/036334
PCT Pub. Date: Feb. 15, 2024

(65) Prior Publication Data
US 2025/0264017 A1  Aug. 21, 2025

(30) Foreign Application Priority Data
Aug. 12, 2022 (EP) .................................. 22306223

(51) Int. Cl.
*G01V 1/00* (2024.01)
*E21B 47/002* (2012.01)
*G01V 1/30* (2006.01)

(52) U.S. Cl.
CPC .......... *E21B 47/0025* (2020.05); *G01V 1/306* (2013.01); *G01V 2210/6226* (2013.01); *G01V 2210/646* (2013.01)

(58) Field of Classification Search
USPC ............................................ 367/69
See application file for complete search history.

(56) References Cited

U.S. PATENT DOCUMENTS 8,183,863 B2 *  5/2012  Goodman ............... G01V 3/24
                                                   324/303
9,983,325 B2 *  5/2018  Pugh ...................... G01V 3/083
(Continued)

FOREIGN PATENT DOCUMENTS

WO     2021154797 A1     8/2021

OTHER PUBLICATIONS

International Search Report and Written Opinion of International Patent Application No. PCT/US2023/072138 dated on Dec. 5, 2023, 10 pages.

(Continued)

*Primary Examiner* — James R Hulka
(74) *Attorney, Agent, or Firm* — Jeffrey D. Frantz

(57) ABSTRACT

A method can include acquiring data from a borehole imaging tool disposed in a borehole in a formation where the borehole includes electrically insulating oil-based fluid introduced into the borehole as a drilling lubricant; determining, based on the data, electrically insulating oil-based fluid impeditivity and a reference formation impeditivity via a circuit model that includes series and parallel terms; and detecting a location of a fracture in the formation based on a change in current flow from the tool through the electrically insulating oil-based fluid and into the formation by determining an effective formation impeditivity based on at least a portion of the data for the location and by comparing (Continued)

the effective formation impeditivity to the reference formation impeditivity.

20 Claims, 13 Drawing Sheets

(56) References Cited

U.S. PATENT DOCUMENTS

| | | | |
|---|---|---|---|
| 11,578,581 B2* | 2/2023 | Dean | C04B 35/62839 |
| 2005/0134280 A1* | 6/2005 | Bittar | G01V 3/24 |
| | | | 324/374 |
| 2006/0255811 A1* | 11/2006 | Bittar | G01V 3/24 |
| | | | 324/367 |
| 2009/0309591 A1 | 12/2009 | Goodman et al. | |
| 2015/0192688 A1 | 7/2015 | Pugh et al. | |
| 2017/0131226 A1* | 5/2017 | Boul | G01N 33/383 |
| 2017/0146680 A1* | 5/2017 | Boul | G01V 3/24 |
| 2017/0227666 A1* | 8/2017 | Legendre | G01V 3/24 |
| 2018/0252840 A1* | 9/2018 | Abellan | G01V 3/24 |
| 2021/0324721 A1 | 10/2021 | Dean | |
| 2022/0120928 A1* | 4/2022 | Hori | E21B 49/00 |

OTHER PUBLICATIONS

Valverde, L. et al., "Characterization of Fractures via Electrical Impedance", Proceedings, Thirty-Eighth Workshop on Geothermal Reservoir Engineering, Feb. 2013, pp. 1-8, Stanford University, Stanford, California.

Luthi, S.M. et al., "Fracture Apertures From Electrical Borehole Scans", Geophysics, Jul. 1990, 13 pages, 55(7), Society of Exploration Geophysicists.

\* cited by examiner

FRACTURE CHARACTERIZATION WHILE DRILLING

CROSS REFERENCE PARAGRAPH

This application is the National Stage Entry of International Application No. PCT/US2023/072138, filed Aug. 14, 2023, which claims the benefit of European Application No. 22306223.3, entitled "FRACTURE CHARACTERIZATION WHILE DRILLING," filed Aug. 12, 2022, the disclosure of which is hereby incorporated herein by reference.

BACKGROUND

A reservoir can be a subsurface formation that can be characterized at least in part by its porosity and fluid permeability. As an example, a reservoir may be part of a basin such as a sedimentary basin. A basin can be a depression (e.g., caused by plate tectonic activity, subsidence, etc.) in which sediments accumulate. As an example, where hydrocarbon source rocks occur in combination with appropriate depth and duration of burial, a petroleum system may develop within a basin, which may form a reservoir that includes hydrocarbon fluids (e.g., oil, gas, etc.). Various operations may be performed in the field to access such hydrocarbon fluids and/or produce such hydrocarbon fluids. For example, consider equipment operations where equipment may be controlled to perform one or more operations. In such an example, control may be based at least in part on characteristics of rock, which can be present as three-dimensional objects in drilling fluid (e.g., mud).

SUMMARY

A method can include acquiring data from a borehole imaging tool disposed in a borehole in a formation where the borehole includes electrically insulating oil-based fluid introduced into the borehole as a drilling lubricant; determining, based on the data, electrically insulating oil-based fluid impeditivity and a reference formation impeditivity via a circuit model that includes series and parallel terms; and detecting a location of a fracture in the formation based on a change in current flow from the tool through the electrically insulating oil-based fluid and into the formation by determining an effective formation impeditivity based on at least a portion of the data for the location and by comparing the effective formation impeditivity to the reference formation impeditivity. A system can include a processor; memory accessible to the processor; and processor-executable instructions stored in the memory to instruct the system to: acquire data from a borehole imaging tool disposed in a borehole in a formation where the borehole includes electrically insulating oil-based fluid introduced into the borehole as a drilling lubricant; determine, based on the data, electrically insulating oil-based fluid impeditivity and a reference formation impeditivity via a circuit model that includes series and parallel terms; and detect a location of a fracture in the formation based on a change in current flow from the tool through the electrically insulating oil-based fluid and into the formation by determination of an effective formation impeditivity based on at least a portion of the data for the location and by comparison of the effective formation impeditivity to the reference formation impeditivity. One or more non-transitory computer-readable storage media can include processor-executable instructions to instruct a computing system to: acquire data from a borehole imaging tool disposed in a borehole in a formation wherein the borehole includes electrically insulating oil-based fluid introduced into the borehole as a drilling lubricant; determine, based on the data, electrically insulating oil-based fluid impeditivity and a reference formation impeditivity via a circuit model that includes series and parallel terms; and detect a location of a fracture in the formation based on a change in current flow from the tool through the electrically insulating oil-based fluid and into the formation by determination of an effective formation impeditivity based on at least a portion of the data for the location and by comparison of the effective formation impeditivity to the reference formation impeditivity. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

This description is not to be taken in a limiting sense, but rather is made merely for the purpose of describing the general principles of the implementations. The scope of the described implementations should be ascertained with reference to the issued claims.

Figure 1:
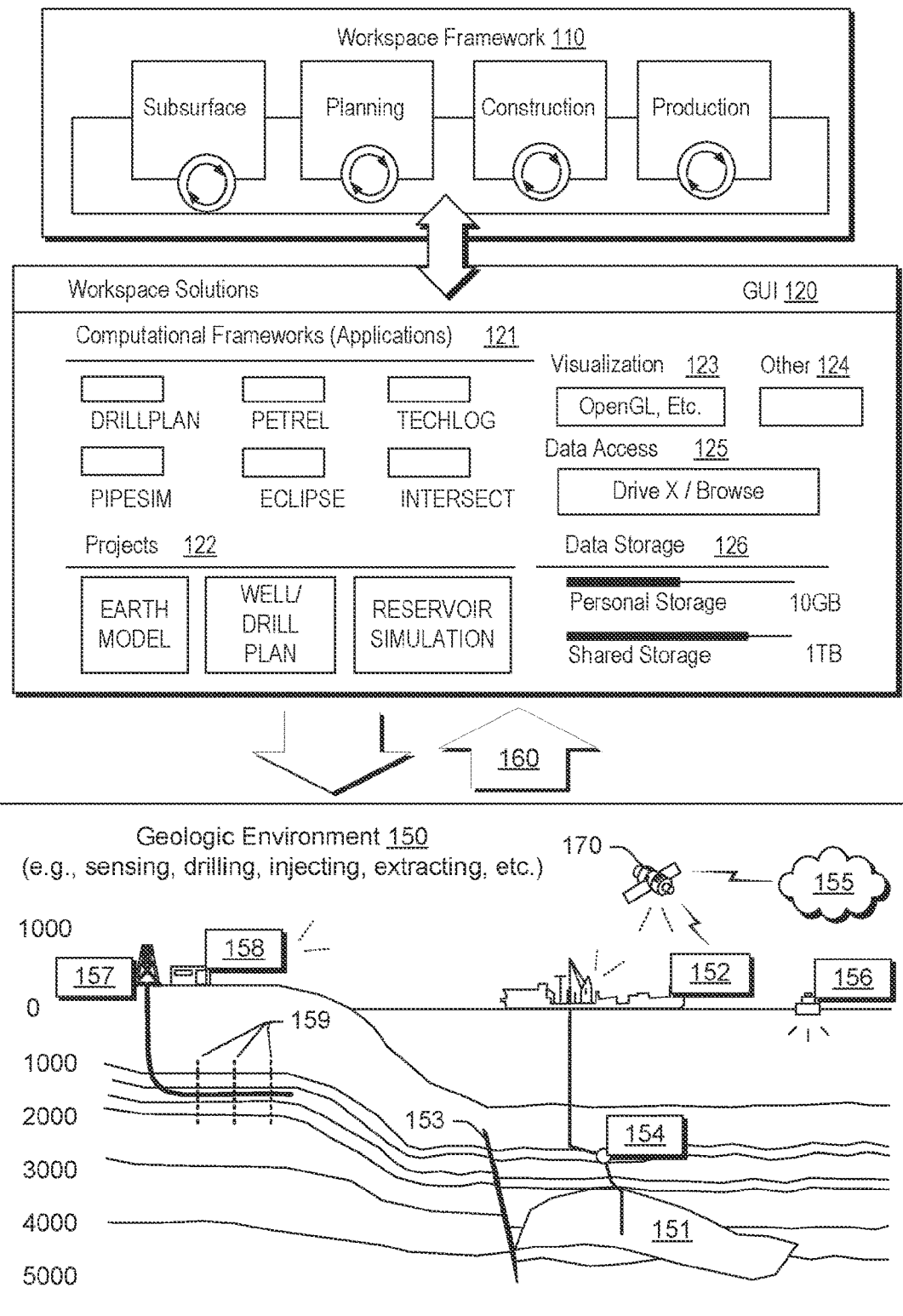
FIG. 1 illustrates an example system that includes various framework components associated with one or more geologic environments.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. A geologic environment 150 may be outfitted with a variety of sensors, detectors, actuators, etc. In such an environment, various types of equipment such as, for example, equipment 152 may include communication circuitry to receive and to transmit information, optionally with respect to one or more networks 155. Such information may include information associated with downhole equipment 154, which may be equipment to acquire information, to assist with resource recovery, etc. Other equipment 156 may be located remote from a wellsite and include sensing, detecting, emitting, or other circuitry. Such equipment may include storage and communication circuitry to store and to communicate data, instructions, etc. One or more satellites may be provided for purposes of communications, data acquisition, etc. For example, FIG. 1 shows a satellite 170 in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc., may exist where an assessment of such variations may assist with planning, operations, etc., to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, PETREL, TECHLOG, PETROMOD, ECLIPSE, and INTERSECT frameworks (Schlumberger Limited, Houston, Texas).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The PETREL framework can be part of the DELFI cognitive exploration and production (E&P) environment (Schlumberger Limited, Houston, Texas, referred to as the DELFI environment) for utilization in geosciences and geoengineering, for example, to analyze subsurface data from exploration to production of fluid from a reservoir.

One or more types of frameworks may be implemented within or in a manner operatively coupled to the DELFI environment, which is a secure, cognitive, cloud-based collaborative environment that integrates data and workflows with digital technologies, such as artificial intelligence (AI) and machine learning (ML). Such an environment can provide for operations that involve one or more frameworks. The DELFI environment may be referred to as the DELFI framework, which may be a framework of frameworks. The DELFI environment can include various other frameworks, which may operate using one or more types of models (e.g., simulation models, etc.).

The TECHLOG framework can handle and process field and laboratory data for a variety of geologic environments (e.g., deepwater exploration, shale, etc.). The TECHLOG framework can structure wellbore data for analyses, planning, etc.

The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (Schlumberger Limited, Houston Texas). The PIPESIM simulator may be an optimizer that can optimize one or more operational scenarios at least in part via simulation of physical phenomena.

The ECLIPSE framework provides a reservoir simulator with numerical solvers for prediction of dynamic behavior for various types of reservoirs and development schemes.

The INTERSECT framework provides a high-resolution reservoir simulator for simulation of geological features and quantification of uncertainties, for example, by creating production scenarios and, with the integration of precise models of the surface facilities and field operations, the INTERSECT framework can produce results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical-enhanced-oil-recovery (EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI environment, for example, for rapid simulation of multiple concurrent cases.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150, and feedback 160 can be received via one or more interfaces in one or more forms (e.g., acquired data as to operational conditions, equipment conditions, environment conditions, etc.).

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

Visualization features may provide for visualization of various earth models, properties, etc., in one or more dimensions. As an example, visualization features may include one or more control features for control of equipment, which can include, for example, field equipment that can perform one or more field operations. A workflow may utilize one or more frameworks to generate information that can be utilized to control one or more types of field equipment (e.g., drilling equipment, wireline equipment, fracturing equipment, etc.).

As to a reservoir model that may be suitable for utilization by a simulator, consider acquisition of seismic data as acquired via reflection seismology, which finds use in geophysics, for example, to estimate properties of subsurface formations. Seismic data may be processed and interpreted, for example, to understand better composition, fluid content, extent and geometry of subsurface rocks. Such interpretation results can be utilized to plan, simulate, perform, etc., one or more operations for production of fluid from a reservoir (e.g., reservoir rock, etc.). Field acquisition equipment may be utilized to acquire seismic data, which may be in the form of traces where a trace can include values organized with respect to time and/or depth (e.g., consider 1D, 2D, 3D or 4D seismic data).

A model may be a simulated version of a geologic environment where a simulator may include features for simulating physical phenomena in a geologic environment based at least in part on a model or models. A simulator, such as a reservoir simulator, can simulate fluid flow in a geologic environment based at least in part on a model that can be generated via a framework that receives seismic data. A simulator can be a computerized system (e.g., a computing system) that can execute instructions using one or more processors to solve a system of equations that describe physical phenomena subject to various constraints. In such an example, the system of equations may be spatially defined (e.g., numerically discretized) according to a spatial model that that includes layers of rock, geobodies, etc., that have corresponding positions that can be based on interpretation of seismic and/or other data. A spatial model may be a cell-based model where cells are defined by a grid (e.g., a mesh). A cell in a cell-based model can represent a physical area or volume in a geologic environment where the cell can be assigned physical properties (e.g., permeability, fluid properties, etc.) that may be germane to one or more physical phenomena (e.g., fluid volume, fluid flow, pressure, etc.). A reservoir simulation model can be a spatial model that may be cell-based.

While several simulators are illustrated in the example of FIG. 1, one or more other simulators may be utilized, additionally or alternatively. For example, consider the VISAGE geomechanics simulator (Schlumberger Limited, Houston Texas) or the PETROMOD simulator (Schlumberger Limited, Houston Texas), etc. The VISAGE simulator includes finite element numerical solvers that may provide simulation results such as, for example, results as to compaction and subsidence of a geologic environment, well and completion integrity in a geologic environment, cap-rock and fault-seal integrity in a geologic environment, fracture behavior in a geologic environment, thermal recovery in a geologic environment, $CO_2$ disposal, etc. The PETROMOD framework provides petroleum systems modeling capabilities that can combine one or more of seismic, well, and geological information to model the evolution of a sedimentary basin. The PETROMOD framework can predict if, and how, a reservoir has been charged with hydrocarbons, including the source and timing of hydrocarbon generation, migration routes, quantities, and hydrocarbon type in the subsurface or at surface conditions. The MANGROVE simulator (Schlumberger Limited, Houston, Texas) provides for optimization of stimulation design (e.g., stimulation treatment operations such as hydraulic fracturing) in a reservoir-centric environment. The MANGROVE framework can combine scientific and experimental work to predict geomechanical propagation of hydraulic fractures, reactivation of natural fractures, etc., along with production forecasts within 3D reservoir models (e.g., production from a drainage area of a reservoir where fluid moves via one or more types of fractures to a well and/or from a well). The MANGROVE framework can provide results pertaining to heterogeneous interactions between hydraulic and natural fracture networks, which may assist with optimization of the number and location of fracture treatment stages (e.g., stimulation treatment(s)), for example, to increased perforation efficiency and recovery.

Figure 2:
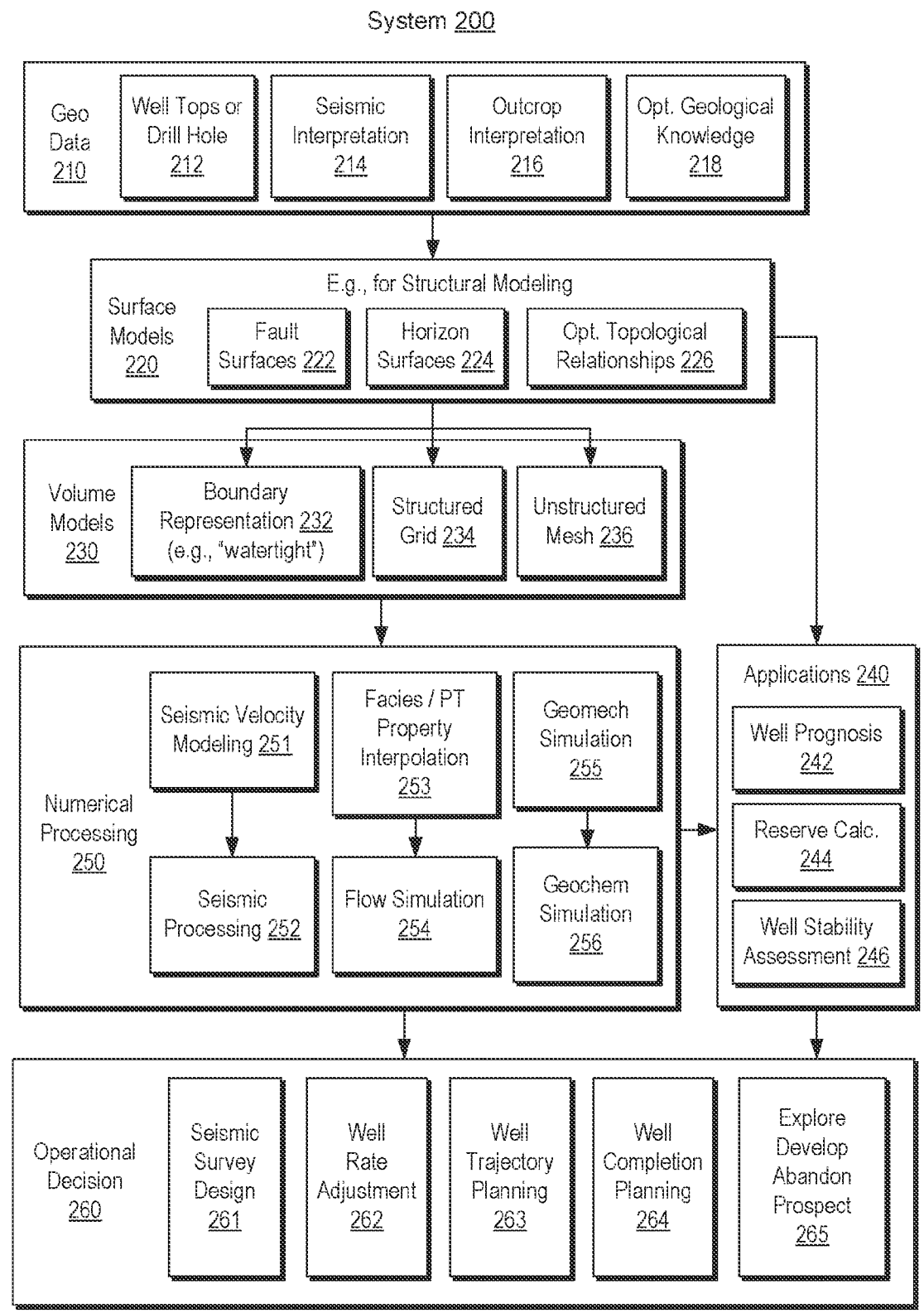
FIG. 2 illustrates an example of a system.

FIG. 2 shows an example of a system 200 that can be operatively coupled to one or more databases, data streams, etc. For example, one or more pieces of field equipment, laboratory equipment, computing equipment (e.g., local and/or remote), etc., can provide and/or generate data that may be utilized in the system 200.

As shown, the system 200 can include a geological/geophysical data block 210, a surface models block 220 (e.g., for one or more structural models), a volume modules block 230, an applications block 240, a numerical processing block 250 and an operational decision block 260. As shown in the example of FIG. 2, the geological/geophysical data block 210 can include data from well tops or drill holes 212, data from seismic interpretation 214, data from outcrop interpretation and optionally data from geological knowledge. As an example, the geological/geophysical data block 210 can include data from digital images, which can include digital images of cores, cuttings, cavings, outcrops, etc. As to the surface models block 220, it may provide for creation, editing, etc. of one or more surface models based on, for example, one or more of fault surfaces 222, horizon surfaces 224 and optionally topological relationships 226. As to the volume models block 230, it may provide for creation, editing, etc. of one or more volume models based on, for example, one or more of boundary representations 232 (e.g., to form a watertight model), structured grids 234 and unstructured meshes 236.

As shown in the example of FIG. 2, the system 200 may allow for implementing one or more workflows, for example, where data of the data block 210 are used to create, edit, etc. one or more surface models of the surface models block 220, which may be used to create, edit, etc. one or more volume models of the volume models block 230. As indicated in the example of FIG. 2, the surface models block 220 may provide one or more structural models, which may be input to the applications block 240. For example, such a structural model may be provided to one or more applications, optionally without performing one or more processes of the volume models block 230 (e.g., for purposes of numerical processing by the numerical processing block 250). Accordingly, the system 200 may be suitable for one or more workflows for structural modeling (e.g., optionally without performing numerical processing per the numerical processing block 250).

As to the applications block 240, it may include applications such as a well prognosis application 242, a reserve calculation application 244 and a well stability assessment application 246. As to the numerical processing block 250, it may include a process for seismic velocity modeling 251 followed by seismic processing 252, a process for facies and petrophysical property interpolation 253 followed by flow simulation 254, and a process for geomechanical simulation 255 followed by geochemical simulation 256. As indicated, as an example, a workflow may proceed from the volume models block 230 to the numerical processing block 250 and then to the applications block 240 and/or to the operational decision block 260. As another example, a workflow may proceed from the surface models block 220 to the applications block 240 and then to the operational decisions block 260 (e.g., consider an application that operates using a structural model).

In the example of FIG. 2, the operational decisions block 260 may include a seismic survey design process 261, a well rate adjustment process 252, a well trajectory planning process 263, a well completion planning process 264 and a process for one or more prospects, for example, to decide whether to explore, develop, abandon, etc. a prospect.

Referring again to the data block 210, the well tops or drill hole data 212 may include spatial localization, and optionally surface dip, of an interface between two geological formations or of a subsurface discontinuity such as a geological fault; the seismic interpretation data 214 may include a set of points, lines or surface patches interpreted from seismic reflection data, and representing interfaces between media (e.g., geological formations in which seismic wave velocity differs) or subsurface discontinuities; the outcrop interpretation data 216 may include a set of lines or points, optionally associated with measured dip, representing boundaries between geological formations or geological faults, as interpreted on the earth surface; and the geological knowledge data 218 may include, for example knowledge of the paleo-tectonic and sedimentary evolution of a region.

As to a structural model, it may be, for example, a set of gridded or meshed surfaces representing one or more interfaces between geological formations (e.g., horizon surfaces) or mechanical discontinuities (fault surfaces) in the subsurface. As an example, a structural model may include some information about one or more topological relationships between surfaces (e.g. fault A truncates fault B, fault B intersects fault C, etc.).

As to the one or more boundary representations 232, they may include a numerical representation in which a subsurface model is partitioned into various closed units representing geological layers and fault blocks where an individual unit may be defined by its boundary and, optionally, by a set of internal boundaries such as fault surfaces.

As to the one or more structured grids 234, it may include a grid that partitions a volume of interest into different elementary volumes (cells), for example, that may be indexed according to a pre-defined, repeating pattern. As to the one or more unstructured meshes 236, it may include a mesh that partitions a volume of interest into different elementary volumes, for example, that may not be readily indexed following a pre-defined, repeating pattern (e.g., consider a Cartesian cube with indexes I, J, and K, along x, y, and z axes).

As to the seismic velocity modeling 251, it may include calculation of velocity of propagation of seismic waves (e.g., where seismic velocity depends on type of seismic wave and on direction of propagation of the wave). As to the seismic processing 252, it may include a set of processes allowing identification of localization of seismic reflectors in space, physical characteristics of the rocks in between these reflectors, etc.

As to the facies and petrophysical property interpolation 253, it may include an assessment of type of rocks and of their petrophysical properties (e.g., porosity, permeability), for example, optionally in areas not sampled by well logs or coring. As an example, such an interpolation may be constrained by interpretations from log and core data, and by prior geological knowledge.

As to the flow simulation 254, as an example, it may include simulation of flow of hydro-carbons in the subsurface, for example, through geological times (e.g., in the context of petroleum systems modeling, when trying to predict the presence and quality of oil in an un-drilled formation) or during the exploitation of a hydrocarbon reservoir (e.g., when some fluids are pumped from or into the reservoir).

As to geomechanical simulation 255, it may include simulation of the deformation of rocks under boundary conditions. Such a simulation may be used, for example, to assess compaction of a reservoir (e.g., associated with its depletion, when hydrocarbons are pumped from the porous and deformable rock that composes the reservoir). As an example, a geomechanical simulation may be used for a variety of purposes such as, for example, prediction of fracturing, reconstruction of the paleo-geometries of the reservoir as they were prior to tectonic deformations, etc.

As to geochemical simulation 256, such a simulation may simulate evolution of hydrocarbon formation and composition through geological history (e.g., to assess the likelihood of oil accumulation in a particular subterranean formation while exploring new prospects).

As to the various applications of the applications block 240, the well prognosis application 242 may include predicting type and characteristics of geological formations that may be encountered by a drill bit, and location where such rocks may be encountered (e.g., before a well is drilled); the reserve calculations application 244 may include assessing total amount of hydrocarbons or ore material present in a subsurface environment (e.g., and estimates of which proportion can be recovered, given a set of economic and technical constraints); and the well stability assessment application 246 may include estimating risk that a well, already drilled or to-be-drilled, will collapse or be damaged due underground stress.

As to the operational decision block 260, the seismic survey design process 261 may include deciding where to place seismic sources and receivers to optimize the coverage and quality of the collected seismic information while minimizing cost of acquisition; the well rate adjustment process 262 may include controlling injection and production well schedules and rates (e.g., to maximize recovery and production); the well trajectory planning process 263 may include designing a well trajectory to maximize potential recovery and production while minimizing drilling risks and costs; the well trajectory planning process 264 may include selecting proper well tubing, casing and completion (e.g., to meet expected production or injection targets in specified reservoir formations); and the prospect process 265 may include decision making, in an exploration context, to continue exploring, start producing or abandon prospects (e.g., based on an integrated assessment of technical and financial risks against expected benefits).

The system 200 can include and/or can be operatively coupled to a system such as the system 100 of FIG. 1. For example, the workspace framework 110 may provide for instantiation of, rendering of, interactions with, etc., the graphical user interface (GUI) 120 to perform one or more actions as to the system 200. In such an example, access may be provided to one or more frameworks (e.g., DRILLPLAN, PETREL, TECHLOG, PIPESIM, ECLIPSE, INTERSECT, etc.). One or more frameworks may provide for geo data acquisition as in block 210, for structural modeling as in block 220, for volume modeling as in block 230, for running an application as in block 240, for numerical processing as in block 250, for operational decision making as in block 260, etc.

As an example, the system 200 may provide for monitoring data, which can include geo data per the geo data block 210. In various examples, geo data may be acquired during one or more operations. For example, consider acquiring geo data during drilling operations via downhole equipment and/or surface equipment. As an example, the operational decision block 260 can include capabilities for monitoring, analyzing, etc., such data for purposes of making one or more operational decisions, which may include controlling equipment, revising operations, revising a plan, etc. In such an example, data may be fed into the system 200 at one or more points where the quality of the data may be of particular interest. For example, data quality may be characterized by one or more metrics where data quality may provide indications as to trust, probabilities, etc., which may be germane to operational decision making and/or other decision making.

Figure 3:
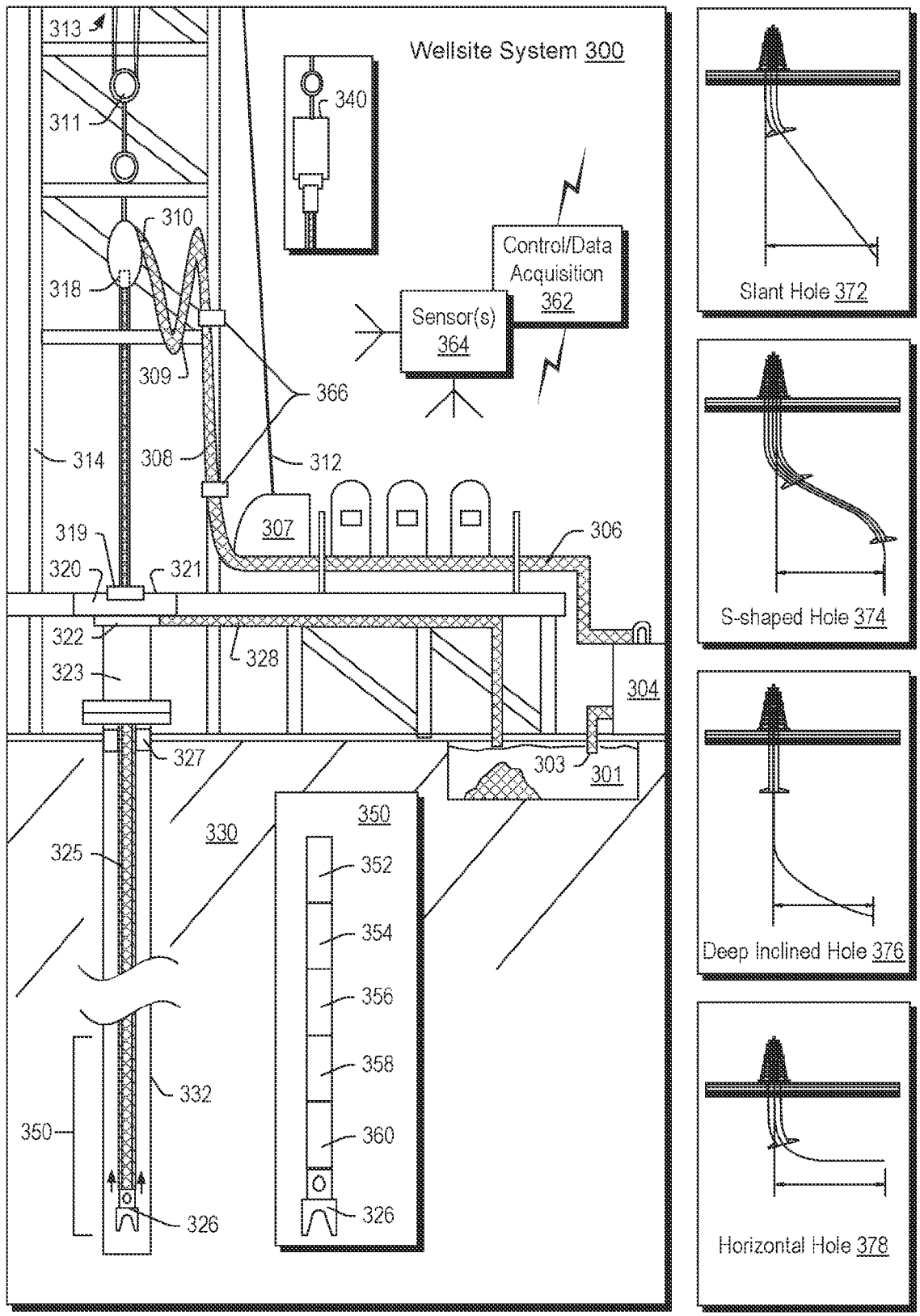
FIG. 3 illustrates an example of a drilling equipment and examples of borehole shapes.

FIG. 3 shows an example of a wellsite system 300 (e.g., at a wellsite that may be onshore or offshore). As shown, the wellsite system 300 can include a mud tank 301 for holding mud and other material (e.g., where mud can be a drilling fluid), a suction line 303 that serves as an inlet to a mud pump 304 for pumping mud from the mud tank 301 such that mud flows to a vibrating hose 306, a drawworks 307 for winching drill line or drill lines 312, a standpipe 308 that receives mud from the vibrating hose 306, a kelly hose 309 that receives mud from the standpipe 308, a gooseneck or goosenecks 310, a traveling block 311, a crown block 313 for carrying the traveling block 311 via the drill line or drill lines 312, a derrick 314, a kelly 318 or a top drive 340, a kelly drive bushing 319, a rotary table 320, a drill floor 321, a bell nipple 322, one or more blowout preventors (BOPs) 323, a drillstring 325, a drill bit 326, a casing head 327 and a flow pipe 328 that carries mud and other material to, for example, the mud tank 301.

In the example system of FIG. 3, a borehole 332 is formed in subsurface formations 330 by rotary drilling; noting that various example embodiments may also use one or more directional drilling techniques, equipment, etc.

As shown in the example of FIG. 3, the drillstring 325 is suspended within the borehole 332 and has a drillstring assembly 350 that includes the drill bit 326 at its lower end. As an example, the drillstring assembly 350 may be a bottom hole assembly (BHA).

The wellsite system 300 can provide for operation of the drillstring 325 and other operations. As shown, the wellsite system 300 includes the traveling block 311 and the derrick 314 positioned over the borehole 332. As mentioned, the wellsite system 300 can include the rotary table 320 where the drillstring 325 pass through an opening in the rotary table 320.

As shown in the example of FIG. 3, the wellsite system 300 can include the kelly 318 and associated components, etc., or the top drive 340 and associated components. As to a kelly example, the kelly 318 may be a square or hexagonal metal/alloy bar with a hole drilled therein that serves as a mud flow path. The kelly 318 can be used to transmit rotary motion from the rotary table 320 via the kelly drive bushing 319 to the drillstring 325, while allowing the drillstring 325 to be lowered or raised during rotation. The kelly 318 can pass through the kelly drive bushing 319, which can be driven by the rotary table 320. As an example, the rotary table 320 can include a master bushing that operatively couples to the kelly drive bushing 319 such that rotation of the rotary table 320 can turn the kelly drive bushing 319 and hence the kelly 318. The kelly drive bushing 319 can include an inside profile matching an outside profile (e.g., square, hexagonal, etc.) of the kelly 318; however, with slightly larger dimensions so that the kelly 318 can freely move up and down inside the kelly drive bushing 319.

As to a top drive example, the top drive 340 can provide functions performed by a kelly and a rotary table. The top drive 340 can turn the drillstring 325. As an example, the top drive 340 can include one or more motors (e.g., electric and/or hydraulic) connected with appropriate gearing to a short section of pipe called a quill, that in turn may be screwed into a saver sub or the drillstring 325 itself. The top drive 340 can be suspended from the traveling block 311, so the rotary mechanism is free to travel up and down the derrick 314. As an example, a top drive 340 may allow for drilling to be performed with more joint stands than a kelly/rotary table approach.

In the example of FIG. 3, the mud tank 301 can hold mud, which can be one or more types of drilling fluids. As an example, a wellbore may be drilled to produce fluid, inject fluid or both (e.g., hydrocarbons, minerals, water, etc.).

In the example of FIG. 3, the drillstring 325 (e.g., including one or more downhole tools) may be composed of a series of pipes threadably connected together to form a long tube with the drill bit 326 at the lower end thereof. As the drillstring 325 is advanced into a wellbore for drilling, at some point in time prior to or coincident with drilling, the mud may be pumped by the pump 304 from the mud tank 301 (e.g., or other source) via the lines 306, 308 and 309 to a port of the kelly 318 or, for example, to a port of the top drive 340. The mud can then flow via a passage (e.g., or passages) in the drillstring 325 and out of ports located on the drill bit 326 (see, e.g., a directional arrow). As the mud exits the drillstring 325 via ports in the drill bit 326, it can then circulate upwardly through an annular region between an outer surface(s) of the drillstring 325 and surrounding wall(s) (e.g., open borehole, casing, etc.), as indicated by directional arrows. In such a manner, the mud lubricates the drill bit 326 and carries heat energy (e.g., frictional or other energy) and formation cuttings to the surface where the mud may be returned to the mud tank 301, for example, for recirculation with processing to remove cuttings and other material.

In the example of FIG. 3, processed mud pumped by the pump 304 into the drillstring 325 may, after exiting the drillstring 325, form a mudcake that lines the wellbore which, among other functions, may reduce friction between the drillstring 325 and surrounding wall(s) (e.g., borehole, casing, etc.). A reduction in friction may facilitate advancing or retracting the drillstring 325. During a drilling operation, the entire drillstring 325 may be pulled from a wellbore and optionally replaced, for example, with a new or sharpened drill bit, a smaller diameter drillstring, etc. As mentioned, the act of pulling a drillstring out of a hole or replacing it in a hole is referred to as tripping. A trip may be referred to as an upward trip or an outward trip or as a downward trip or an inward trip depending on trip direction.

As an example, consider a downward trip where upon arrival of the drill bit 326 of the drillstring 325 at a bottom of a wellbore, pumping of the mud commences to lubricate the drill bit 326 for purposes of drilling to enlarge the wellbore. As mentioned, the mud can be pumped by the pump 304 into a passage of the drillstring 325 and, upon filling of the passage, the mud may be used as a transmission medium to transmit energy, for example, energy that may encode information as in mud-pulse telemetry. Characteristics of the mud can be utilized to determine how pulses are transmitted (e.g., pulse shape, energy loss, transmission time, etc.).

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 325) may be transmitted uphole to an uphole device, which may relay such information to other equipment for processing, control, etc.

As an example, telemetry equipment may operate via transmission of energy via the drillstring 325 itself. For example, consider a signal generator that imparts coded energy signals to the drillstring 325 and repeaters that may receive such energy and repeat it to further transmit the coded energy signals (e.g., information, etc.).

As an example, the drillstring 325 may be fitted with telemetry equipment 352 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 3, an uphole control and/or data acquisition system 362 may include circuitry to sense pressure pulses generated by telemetry equipment 352 and, for example, communicate sensed pressure pulses or information derived therefrom for process, control, etc.

The assembly 350 of the illustrated example includes a logging-while-drilling (LWD) module 354, a measurement-while-drilling (MWD) module 356, an optional module 358, a rotary-steerable system (RSS) and/or motor 360, and the drill bit 326. Such components or modules may be referred to as tools where a drillstring can include a plurality of tools.

As to a RSS, it involves technology utilized for directional drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling can commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; however, a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit (e.g., during directional drilling, etc.). A PDM operates as drilling fluid is pumped through it where the PDM converts hydraulic power of the drilling fluid into mechanical power to cause the bit to rotate.

As an example, a PDM may operate in a combined rotating mode where surface equipment is utilized to rotate a bit of a drillstring (e.g., a rotary table, a top drive, etc.) by rotating the entire drillstring and where drilling fluid is utilized to rotate the bit of the drillstring. In such an example, a surface RPM (SRPM) may be determined by use of the surface equipment and a downhole RPM of the mud motor may be determined using various factors related to flow of drilling fluid, mud motor type, etc. As an example, in the combined rotating mode, bit RPM can be determined or estimated as a sum of the SRPM and the mud motor RPM, assuming the SRPM and the mud motor RPM are in the same direction.

A PDM mud motor may be operated in various modes such as, for example, a rotating mode and a so-called sliding mode, which can be without rotation of a drillstring from the surface. In such an example, a bit RPM can be determined or estimated based on the RPM of the mud motor.

A RSS can drill directionally where there is continuous rotation from surface equipment, which can alleviate the sliding of a steerable motor (e.g., a PDM). A RSS may be deployed when drilling directionally (e.g., deviated, horizontal, or extended-reach wells). A RSS can aim to minimize interaction with a borehole wall, which can help to preserve borehole quality. A RSS can aim to exert a relatively consistent side force akin to stabilizers that rotate with the drillstring or orient the bit in the desired direction while continuously rotating at the same number of rotations per minute as the drillstring.

The LWD module 354 may be housed in a suitable type of drill collar and can contain one or a plurality of selected types of logging tools. It will also be understood that more than one LWD and/or MWD module can be employed, for example, as represented at by the module 356 of the drillstring assembly 350. Where the position of an LWD module is mentioned, as an example, it may refer to a module at the position of the LWD module 354, the module 356, etc. An LWD module can include capabilities for measuring, processing, and storing information, as well as for communicating with the surface equipment. In the illustrated example, the LWD module 354 may include a seismic measuring device.

The MWD module 356 may be housed in a suitable type of drill collar and can contain one or more devices for measuring characteristics of the drillstring 325 and the drill bit 326. As an example, the MWD tool 354 may include equipment for generating electrical power, for example, to power various components of the drillstring 325. As an example, the MWD tool 354 may include the telemetry equipment 352, for example, where the turbine impeller can generate power by flow of the mud; it being understood that other power and/or battery systems may be employed for purposes of powering various components. As an example, the MWD module 356 may include one or more of the following types of measuring devices: a weight-on-bit measuring device, a torque measuring device, a vibration measuring device, a shock measuring device, a stick slip measuring device, a direction measuring device, and an inclination measuring device.

FIG. 3 also shows some examples of types of holes that may be drilled. For example, consider a slant hole 372, an S-shaped hole 374, a deep inclined hole 376 and a horizontal hole 378.

A drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

A directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As explained, a system may be a steerable system and may include equipment to perform a method such as geosteering. A steerable system can include equipment on a lower part of a drillstring which, just above a drill bit, a bent sub may be mounted. Above directional drilling equipment, a drillstring can include MWD equipment that provides real time or near real time data of interest (e.g., inclination, direction, pressure, temperature, real weight on the drill bit, torque stress, etc.) and/or LWD equipment. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment to follow a desired route to reach a desired target or targets.

A drillstring may include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

Geosteering can include intentional directional control of a wellbore based on results of downhole geological logging measurements in a manner that aims to keep a directional wellbore within a desired region, zone (e.g., a pay zone), etc. Geosteering may include directing a wellbore to keep the wellbore in a particular section of a reservoir, for example, to minimize gas and/or water breakthrough and, for example, to maximize economic production from a well that includes the wellbore.

Referring again to FIG. 3, the wellsite system 300 can include one or more sensors 364 that are operatively coupled to the control and/or data acquisition system 362. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 300.

The system 300 can include one or more sensors 366 that can sense and/or transmit signals to a fluid conduit such as a drilling fluid conduit (e.g., a drilling mud conduit). For example, in the system 300, the one or more sensors 366 can be operatively coupled to portions of the standpipe 308 through which mud flows. As an example, a downhole tool can generate pulses that can travel through the mud and be sensed by one or more of the one or more sensors 366. In such an example, the downhole tool can include associated circuitry such as, for example, encoding circuitry that can encode signals, for example, to reduce demands as to transmission. Circuitry at the surface may include decoding circuitry to decode encoded information transmitted at least in part via mud-pulse telemetry. Circuitry at the surface may include encoder circuitry and/or decoder circuitry and circuitry downhole may include encoder circuitry and/or decoder circuitry. As an example, the system 300 can include a transmitter that can generate signals that can be transmitted downhole via mud (e.g., drilling fluid) as a transmission medium.

During drilling operations, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", this can refer to a portion of a drillstring that cannot be rotated or moved axially. A condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

A sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

A condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings and/or cavings in the annulus.

Various downhole tools can generate information germane to borehole condition. For example, images of a wall that forms a borehole during drilling can provide information as to layers, boundaries, formation characteristics, etc. In various instances, fractures may be detected via analysis of downhole imagery. Fractures can include natural fractures and fractures from resulting from drilling and/or other downhole operations. Information regarding fractures can be utilized when planning and/or performing downhole operations, which can include, for example, completions operations, drilling operations, etc. As an example, an imaging tool can utilize electrical resistivity to acquire images of a borehole wall during a drilling operation. In such an example, the drilling operation may be controlled based at least in part on such acquired images.

As to an example of an imaging tool, consider the FMI fullbore formation microimager (Schlumberger Limited, Houston, Texas), which can provide real-time microresistivity formation images and dip data. With 80% borehole coverage in 8-in boreholes (e.g., approximately 20 cm) and 0.2-in image resolution (e.g., approximately 0.5 cm) in the vertical and azimuthal directions, imaging with the FMI microimager can provide data that can help in determining net pay, for example, in laminated sediments of fluvial and turbidite depositional environments. Knowledge of sedimentary features can assist with determining reservoir geometry and petrophysical reservoir parameters. In various instances, image details can be discerned down to 50 microns, which may complement coring and sampling data. Interpretations that combine images and derived sedimentary dip data from an imaging tool can provide greater insights into structures, particularly as to natural structures and/or drilling induced structures.

Data acquired by an imaging tool can be utilized in building a mechanical earth model, which may assist in prediction of type and position of drilling-induced features in a borehole. In such an approach, knowledge of the directions and relative magnitude of the principal stresses can help to optimize drilling, completions, etc. As to completions, image data analysis can help to identify maximum permeability direction in a fractured reservoir to assist with completions design for optimal production.

The aforementioned FMI microimager tool can generate an electrical image of a borehole using over one-hundred microresistivity measurements. Focusing circuitry can act to force measuring currents into a formation, where they can produce both low-frequency signals rich with petrophysical and lithological information and a high-resolution component that provides the microresistivity data used for imaging, which may facilitate dip interpretation. The spacing of button electrodes, pad and flap design, and high-frequency data transmission provide a vertical and azimuthal resolution of 0.2 in (e.g., approximately 0.5 cm) such that a feature that is 0.2 in (e.g., approximately 0.5 cm) or larger can be readily estimated from an image; noting that size of features smaller than 0.2 in (e.g., approximately 0.5 cm) may be estimated by quantifying the electrode current flow.

As an example, a borehole imaging tool such as the TERRASPHERE service tool (Schlumberger Limited, Houston, Texas) may be utilized. Such a tool includes an electromagnetic subsystem that can send pulses from sensors through mud and into a formation at a wide range of frequencies that produce resistivity images across the broad range of resistivities encountered in subsurface geological environments. An acoustic subsystem can be included that emits short ultrasonic pulses and detects resulting echoes from a borehole wall, which can provide for robust measurements in heavy mud weight drilling fluids with high attenuation. Such a tool may utilize frequent sensor sampling and focusing to deliver a resolution comparable to wireline ultrasonic imaging tools in oil- and water-based mud systems.

As explained, a borehole imaging tool can include multi-physics technologies collocated in one tool to enhance geological and borehole understanding in various environments while drilling. A multi-physics tool can generate images that are complementary, with the resistivity images rich in bedding features and the ultrasonic images more sensitive to fractures and borehole conditions.

Figure 4:
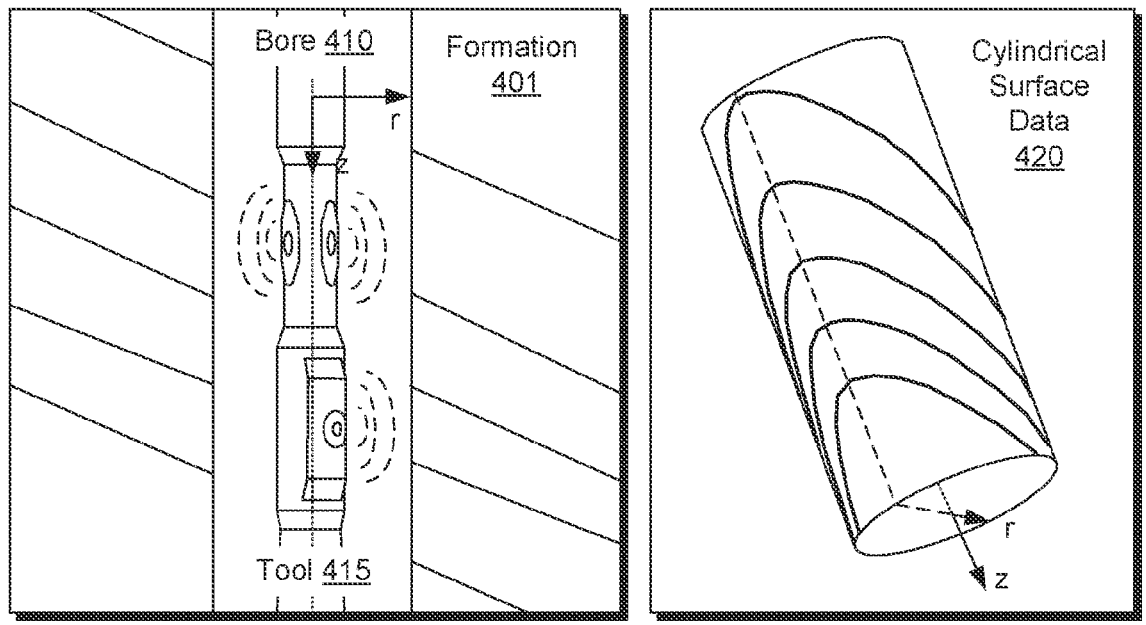
FIG. 4 illustrates an example of a borehole imaging tool and examples of associated data.
Figure 4:
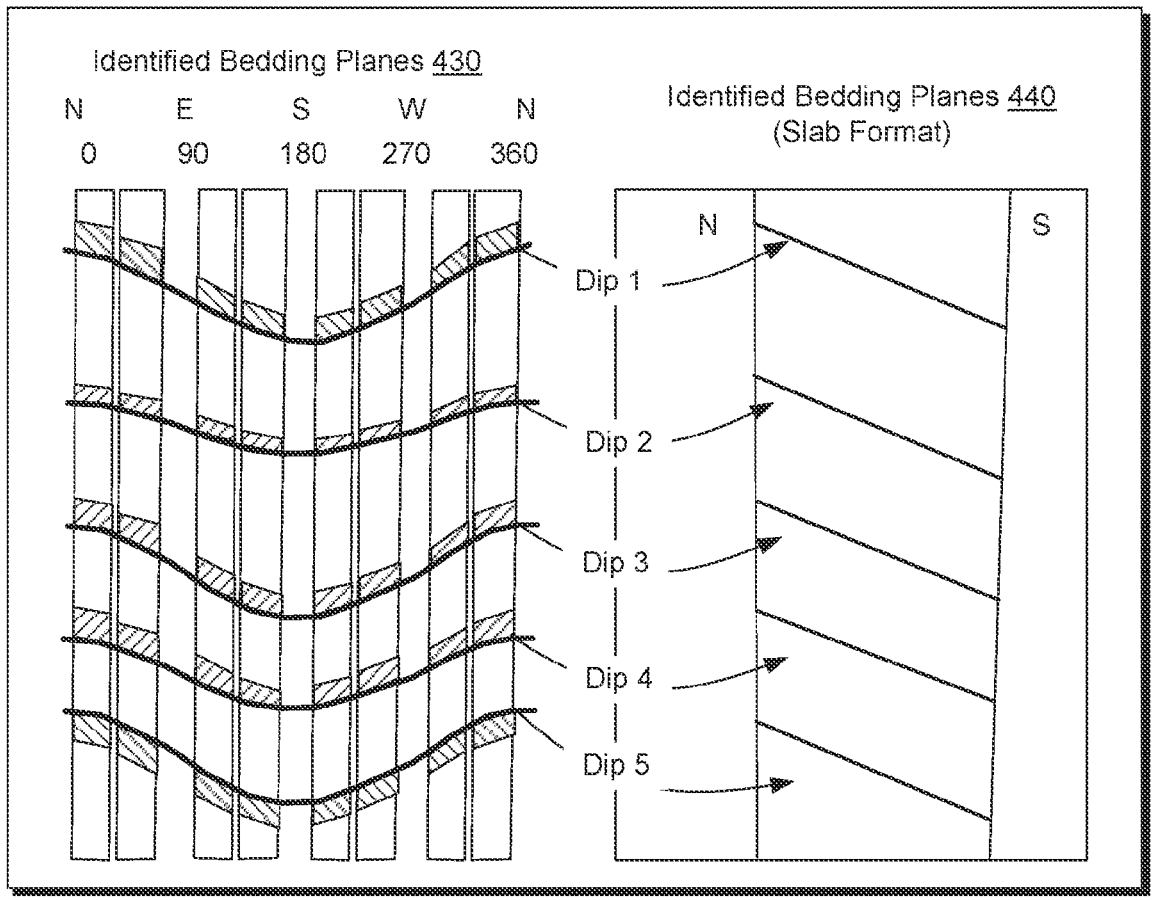

FIG. 4 shows an example of a formation 401 with a bore 410 (e.g., a borehole) and a borehole imaging tool 415 disposed in the borehole that can be configured to acquire electrical borehole images and current related information. As mentioned, a borehole imaging tool may be part of a drillstring where data can be acquired during drilling operations. As an example, the borehole imaging tool 415 may be included as a part of a drillstring. As an example, the borehole imaging tool 415 may include multi-physics capabilities.

As an example, a data acquisition sequence for the tool 415 can include delivering electrical current into material defining a borehole while translating and/or rotating the tool in the borehole, and sensing current, which is altered by interactions with the material. Acquired data can include, for example, data having at least some petrophysical and/or geological relevance.

In the example of FIG. 4, the tool 415 may acquire raw data as multiple electrode readings. A sample rate for electrode data can be on the order of about 120 samples/ft (e.g., approximately 400 samples/m). Areal coverage of a borehole face can be a function of width of electrode arrays, borehole diameter, etc. As an example, less than an entire borehole face may be imaged. Where data are not collected, so-called "non-imaged parts", raw data may be separated by blank "strips" (e.g., between adjacent pads on a resulting borehole log).

As shown in the example of FIG. 4, at least a portion of the data acquired is an electrical (or other petrophysical parameter) image of the formations and features present at the borehole and may be referred to as cylindrical surface data 420, which may be defined using one or more radii, r, and a borehole axis, z. As an example, an image may be a circumferential image where data are organized about a circumference, which may correspond to a circumference of a borehole, at a radial distance beyond a surface of a borehole, etc. (e.g., depending on technique implemented for data acquisition). FIG. 4 also shows how bedding planes 430 may be identified by "unrolling" the cylindrical surface data 420 or by transforming it to a slab format 440, where directions and/or angles may be specified.

As an example, a borehole may be drilled into a formation or a structure where a borehole imaging tool can be disposed in the borehole for acquisition of data. In such an example, acquired data from the borehole imaging tool may be utilized to detect fractures and orientation of fractures and optionally other one or more other features. In such an example, images and/or current related data may be analyzed. As an example, a method can include utilizing borehole imaging data for detecting and/or monitoring fractures and/or cracks in porous media exposed to fluids such as, for example, water and oil, where porous media can include one or more of subsurface formations, masonry structures, cement structures, etc.

As mentioned, drilling can utilize drilling fluid, which may be referred to as mud or drilling mud. Drilling fluid classes can include water-based muds (WBM) and non-aqueous fluids (NAF) where, within the latter group, oil-based muds (OBM) and synthetic-based muds (SBM) may be distinguished.

OBM may be utilized where lubricating properties thereof are better than those of WBM. OBM can also be more costly than WBM; noting that recycling costs and processes may be considered in mud section. As an example, for challenging drilling scenarios and/or where salt formations may be encountered, OBM may be selected over WBM (e.g., consider water having an ability to dissolve various salts). As an example, offshore drilling to substantial depths may utilize OBM, particularly where salt formations are present. As an example, consider formations that can include a pre-salt layer, which can be a diachronous series of geological formations on the continental shelves of extensional basins formed after the break-up of Gondwana, characterized by the deposition of thick layers of evaporites, mostly salt.

Some of the petroleum that was generated from sediments in the pre-salt layer has not migrated upward to the post-salt layers above due to salt domes (e.g., consider regions off the coast of Africa and Brazil). Thus, drilling can involve drilling through one or more salt layers (e.g., salt formations, etc.).

Where a borehole imaging tool relies on electrical current, the electrical properties of fluid at and/or proximate to a borehole wall can impact the effectiveness of the borehole imaging tool. In various examples, a borehole imaging tool can be utilized in an environment that includes oil where, for example, a method may be implemented that differs from a method suited to an oil-free environment.

As explained, imaging tools can provide capabilities for localizing fractures, which, when drilling in hydrocarbon reservoirs, can be utilized to control a drilling process for hydrocarbon production.

As a well is being drilled, mechanical stresses can concentrate in the vicinity of the borehole, which can impact borehole integrity. For example, a borehole may deform, start fracturing to release stress, etc. Where such phenomena occur, a drillstring may stick and get stuck or, for example, mud losses may be experienced as mud flows from the borehole into a formation. More pronounced break-outs may then develop putting zonal isolation via cementing at risk.

Fractures may be visible on images where such fractures can be of geological origin, either cemented of filled by formation fluids. The capability to characterize a fracture enables the discrimination of the type of fractures (e.g., either natural or drilling induced) and allows for a proper diagnostic for an operator, a controller, etc., which can adapt drilling parameters (e.g., mud weight, mud flow rate, RPM, weight on bit (WOB), etc.) to limit or otherwise address borehole damage.

Hydrocarbon production in carbonates or sandstones frequently relies on fractures in the rock as the rock matrix itself may offer too low permeability and hydrocarbon mobility. A reliable production prediction and interpretation demands accurate fracture characterization. In particular, fractures can be characterized as open and flow-supporting or closed, filled with minerals or other solids. Differentiation of natural and induced fractures can also assist with drilling and/or other operations.

In wells with conductive, water-based mud, fracture characterization can be performed using techniques where water-based electrical properties suffice. Electric and ultrasonic borehole images or a combination of both can be utilized to identify fractures and quantify their status: open fractures allow conductive water-based drilling fluids (e.g., WBM) to enter, which renders them quite visible as conductive streaks on electric images and low amplitude traces on ultrasonic images. On the other hand, closed fractures do not permit fluid entry such that, where mineralized, they appear as electrically resistive and as high amplitude signatures on ultrasonic images. When a fracture is open, in a water-based environment, the aperture of the fracture can be quantified based on excess current measured as a tool passes the fracture.

As explained, electrical imaging tools can be part of a MWD and/or a LWD enabled drillstring where, for one or more reasons, drilling may utilize oil-based muds (e.g., non-aqueous muds). Where oil-based muds are utilized, various techniques for water-based mud environments produce suboptimal results because, when oil is present, the electrical response to a fracture is more complex. For example, readings in the presence of oil-based mud can show impedance maxima on edges of a fracture. In various scenarios, relying solely on ultrasonic images may not be a viable option as fracture characterization becomes non-quantitative when the fracture thickness goes below half of a sensor's resolution; noting that many fractures encountered downhole can be below this resolution.

As an example, a method can provide for electrical characterization of fractures, cracks, etc., over a wide frequency range (e.g., approximately 1 MHz to 100 MHz) in a manner that is suitable for operation where oil is present at or proximate to a borehole. Such a method can be applied for boreholes drilled using oil-based muds (OBMs), for example, to classify fractures in an OBM environment. Knowing the resistivity/permittivity in a fracture as a function of frequency can help in distinguishing low dielectric permittivity of oil-based-mud filtrate from higher permittivities found in a porous rock matrix or fracture filling. Dielectric permittivity of oil-based mud and its filtrate exhibits a dielectric permittivity dispersion of a different nature than that encountered in porous media (e.g., generally with stronger dispersion). One or more physical properties, including dispersions thereof, can provide for efficient classification, for examples, as one or more criteria for open versus closed fractures.

As an example, if a fracture is detected as being open, a method may include quantification of its thickness. And, if a fracture is thick enough such that ultrasonic measurements can quantify fracture thickness, a method can quantify the fracture's electrical parameters, even in various cases below the resolution of an electrical imager.

As explained, a borehole imaging tool can provide centimeter-resolution images of a rock surface on a borehole wall. While ultrasonic images provide pure surface information, electric or electromagnetic images probe material properties of porous rock (e.g., porous rock medium or media) exposed to the borehole. A laterolog electric imager, operating at a frequency of 1.5 kHz in conductive, water-based mud, tends to be mostly sensitive to fluid content of rock. Ultrasonic images and electromagnetic images can, individually, allow for identifying fractures in rock; noting that electromagnetic images can allow for characterizing material content of fractures close to a borehole wall.

As mentioned, electrical properties of oil-based and water-based fluids can differ. In general, oil-based drilling fluids are electrically insulating compared to water-based drilling fluids. Further, a rock matrix, given its mineral content, can be electrically insulating. The presence of water in an environment provides for some amount of electric conductivity. Hence electric images of oil-based-mud-filled wells can at best detect the presence of water, which usually is the irreducible water in the porous rock. In various instances, over-pressured oil-based-mud filtrate will have pushed away movable water from a borehole wall. Lower frequency electric images tend to be limited by the insulating film of oil-based mud, which is measured in series with the much lower resistivity of the rock formation. Hence, electric images tend to be blind to fractures in such oil-based-mud wells, at least where the formations are more conductive than the drilling mud.

On the other hand, higher frequency electromagnetic imager measurements in the multi-MHz frequency range involve capacitive coupling and electromagnetic (radio-wave) radiation to reach beyond the oil-based-mud film between their measure-button electrodes and formation. These measurements detect dielectric properties of their surrounding medium in addition to the electric conductivity from the presence of irreducible water.

In Maxwell's equations, the dielectric permittivity combines with the electric conductivity as real and imaginary parts of a complex-valued material parameter, referred to as the complex dielectric constant. A given operating frequency f with circular frequency $\omega=2\pi f$ gives the overall time dependence $e^{-i\omega t}$, so that each time derivative $\partial_t$ is replaced by a multiplier $-i\omega$. Ohm's law in microscopic form relates the current density $\vec{j}$ to the electric field $\vec{E}$ by the conductivity $\sigma$: $\vec{j}=\sigma\vec{E}$. The dielectric permittivity $\varepsilon$ relates the electric field $\vec{E}$ to the displacement current $\vec{D}$ ($\vec{D}=\varepsilon\vec{E}$). These identities simplify Maxwell-Ampère's equation:

$$\vec{\nabla}\times\vec{H}=\partial_t\vec{D}+\vec{j}=(-i\omega\varepsilon+\sigma)\vec{E}+\vec{j}_0.$$

A transmitter can be described here using source-current density $\vec{j}_0$ where the complex-valued dielectric constant is then: $\varepsilon^*=\varepsilon+i\sigma/\omega$.

As an example, a method can include estimating formation impedance. As mentioned, oil-based muds can be considered electric insulators that can be characterized by their dielectric constant $\varepsilon$ and their loss tangent $\tan\delta$. The loss tangent can be given with knowledge of conductivity $\sigma$ such as:

$$\tan\delta = \frac{\sigma}{\omega\varepsilon}$$

The complex impeditivity of a fluid can then be described by $Z_m$ with units [ohm.m]:

$$1/Z_m=\sigma+j\omega\varepsilon$$

Equivalently, formation electrical characteristics can be described by an impeditivity that can be understood in a first order approximation by a Resistor-Capacitor (RC) parallel circuit. In such an approach, equivalent impeditivity will then follow a dependency w.r.t. the frequency described by:

$$Z_f = \frac{R_t}{1+j*\varepsilon_t R_t \omega}$$

The response of an electrical imager tool can be physically interpreted as impedance that is modelled by an equivalent circuit.

Figure 5:
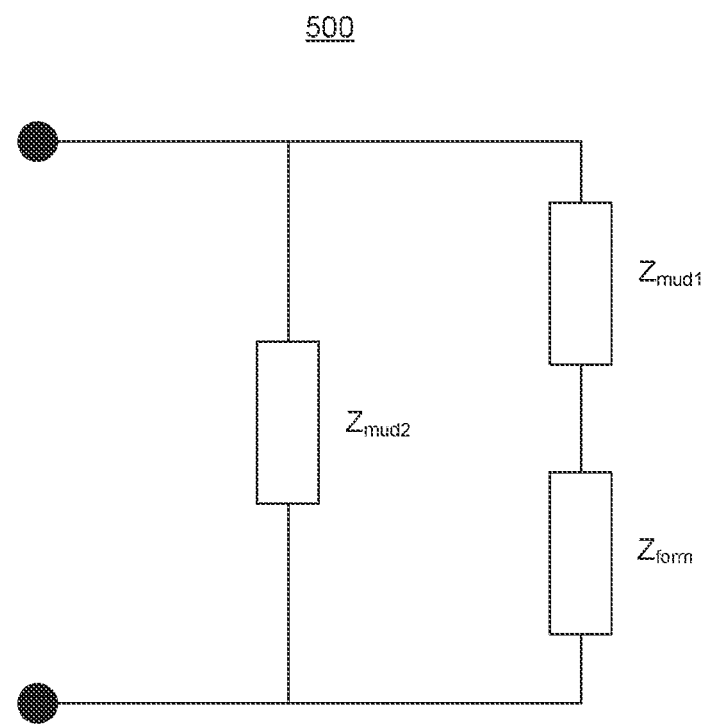
FIG. 5 illustrates an example of a circuit.

FIG. 5 shows an example of an equivalent circuit 500 (e.g., a circuit model or a portion of a circuit model) that includes impedances where $Z_{form}$ is a formation impedance and where $Z_{mud1}$ and $Z_{mud2}$ are mud impedances defined by:

$$Z_{mud1}=k_1(s)\cdot Z_m \text{ and } Z_{mud2}=k_2(s)\cdot Z_m$$

where $k_1$ and $k_2$ are geometric functions depending on tool geometry (e.g., a fixed geometry) and standoff.

Apparent impedance measured by an electrical imager tool can be linked with the contribution by the mud via the equation:

$$\frac{1}{z_{app}} = \frac{1}{k_1(s)\cdot Z_m} + \frac{1}{k_2(s)\cdot Z_m + k\cdot Z_f} \quad (1)$$

where k is the tool geometrical factor and the stand-off value s.

In various instances, mud electrical properties do not change during field jobs and their electrical properties can be estimated while an electrical imager tool is in a casing section (e.g., a cased portion of a borehole). The equivalent electrical circuit may be simplified such that Equation (1) becomes:

$$Z_{app}^{casing}=Z_m\cdot g(s) \quad (2)$$

As to Equation (2), it can be based on the fact that casing impedance can be approximated by zero (null), and apparent impedance in the casing can be shown to be proportional to mud impeditivity with a proportionality factor depending solely on stand-off.

Figure 6:
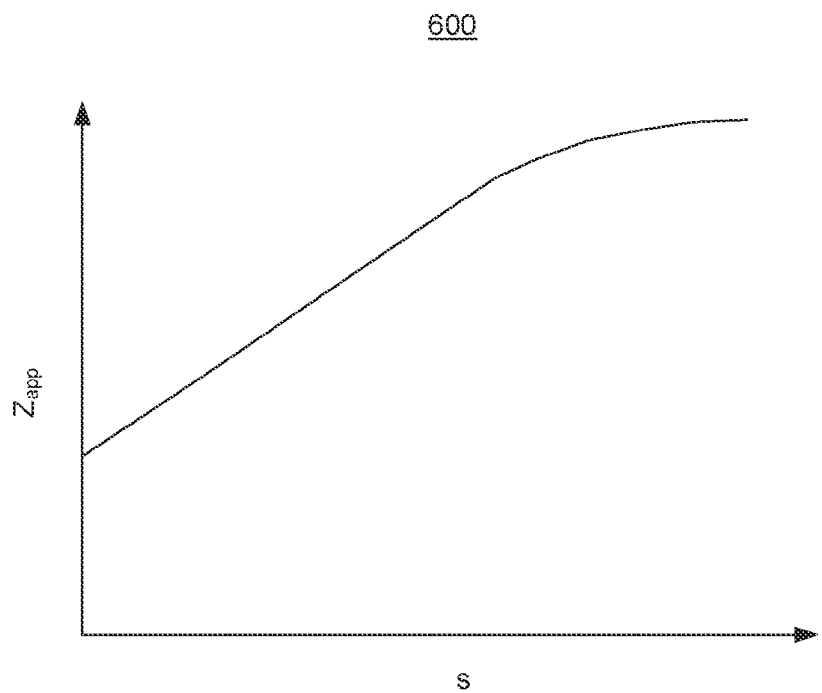
FIG. 6 illustrates an example of a plot.

FIG. 6 shows an example of a plot 600 of impedance versus stand-off to demonstrate impedance stand-off dependency. As shown, as stand-off increases, impedance generally increases with some flattening off at higher stand-off values. In the example of FIG. 6, in a range of stand-off values, the relationship may be approximately linear. As an example, the relationship as shown in the plot 600 can be monotonic.

Given the foregoing, a method can include estimating mud impeditivity $Z_m$ (e.g., mud electrical properties) inside a casing section once stand-off is given by, for example, ultrasonic measurements. In various instances, as mentioned, stand-off dependency can be monotonic (see, e.g., the plot 600 of FIG. 6).

If no data have been acquired in a casing section (e.g., a cased section of a borehole), or if logging mud changes, a method can estimate an on-line value of the mud impeditivity where, for example, two sensors are located on a drill collar, with two different recesses, thus providing two measurements in front of the same location (e.g., at different times) with two known stand-offs. Such a tool arrangement can be described via a set of equations such as:

$$\begin{cases} \frac{1}{z_{app1}} = \frac{1}{k_1(s1)\cdot Z_m} + \frac{1}{k_2(s1)\cdot Z_m + k(s1)\cdot Z_f} \\ \frac{1}{z_{app2}} = \frac{1}{k_1(s2)\cdot Z_m} + \frac{1}{k_2(s2)\cdot Z_m + k(s2)\cdot Z_f} \end{cases}$$

The foregoing set of non-linear equations can be solved for $Z_m$ because $k_1$ and $k_2$ can be known for the two stand-off values, given that an assumption can be made that $k(s1)\approx k(s2)$ if stand-off values are not too dissimilar. In this case, $Z_m$ is the solution of a second order polynomial independent of $Z_f$.

Given that mud impeditivity can be estimated, the formation impedance can be estimated too. The stand-off knowledge (e.g., from ultrasonic measurements) allows the computation of the geometrical factors $k_1$ and $k_2$ and Eq. (1) can provide $(k\cdot Z_f)$, the formation impedance.

Far from a fracture, formation impedance $Z_f^{bckg}$ can be used as a reference background value. As an example, once a sensor of a borehole imaging tool crosses a fracture, with a dielectric/conductivity different from that of the formation, estimated formation impedance across the fracture can be compared with the background formation impeditivity, which can reveal how much current increase or decrease occurs when scanning the fracture.

As an example, a method can consider a borehole imaging tool response to a fracture or fractures. For example, consider the tool 415 of FIG. 4 where electromagnetic modeling of such a tool in front of a fracture or fractures can give insight as to an ability to detect and to characterize a fracture or fractures.

Figure 7:
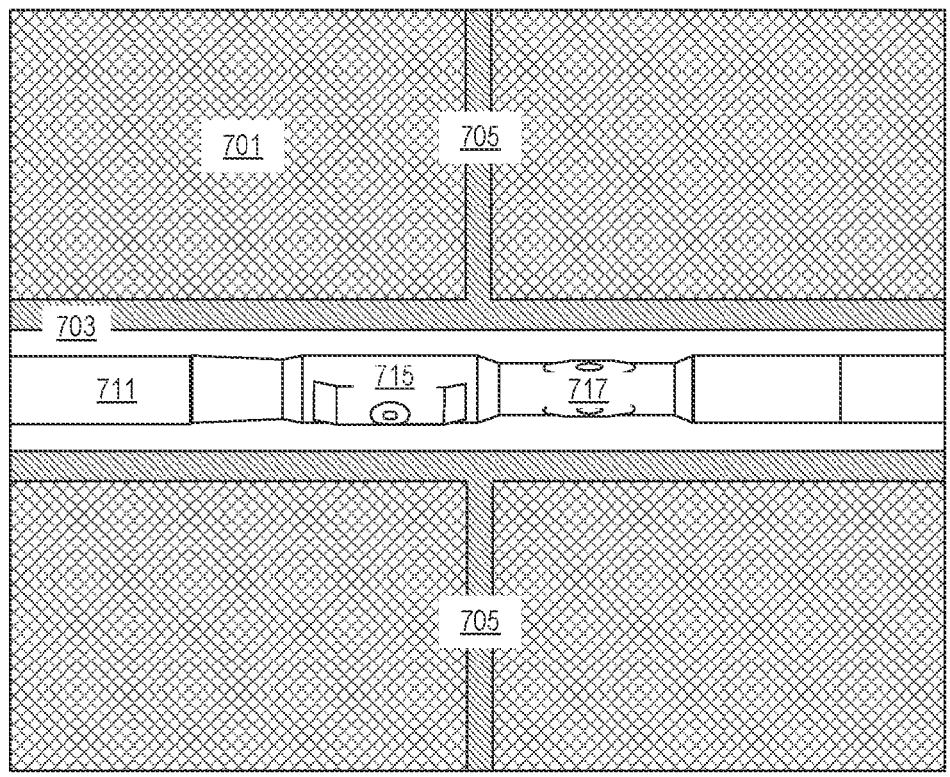
FIG. 7 illustrates an example of a system.

FIG. 7 shows an example of a system 700 where a formation 701 (e.g., rock matrix) is includes a borehole 703 that is intersected by a fracture 705 that extends outwardly from the borehole 703 such that fluid in the borehole may infiltrate the fracture 705. In three dimensions, the fracture 705 may be represented as a relatively thin plane and the borehole 703 may be represented as a tube that passes through the relatively thin plane at a particular angle where the borehole is in fluid communication with the relatively thin plane. As shown, a borehole imaging tool 711 is disposed in the borehole 703 where the borehole imaging tool can include an electrical imager 715 and another imager 717, which may be an ultrasonic imager.

As an example, a model can considers a borehole imaging tool embedded in a borehole filled with OBM. In such an example, the formation outside the borehole may be considered to be a homogeneous medium and that is cut by a fracture filled with the OBM. A model may be represented akin to the system 700 of FIG. 7 and show geometry and expected response. Such a model may consider expected response in two different background formations.

Figure 8:
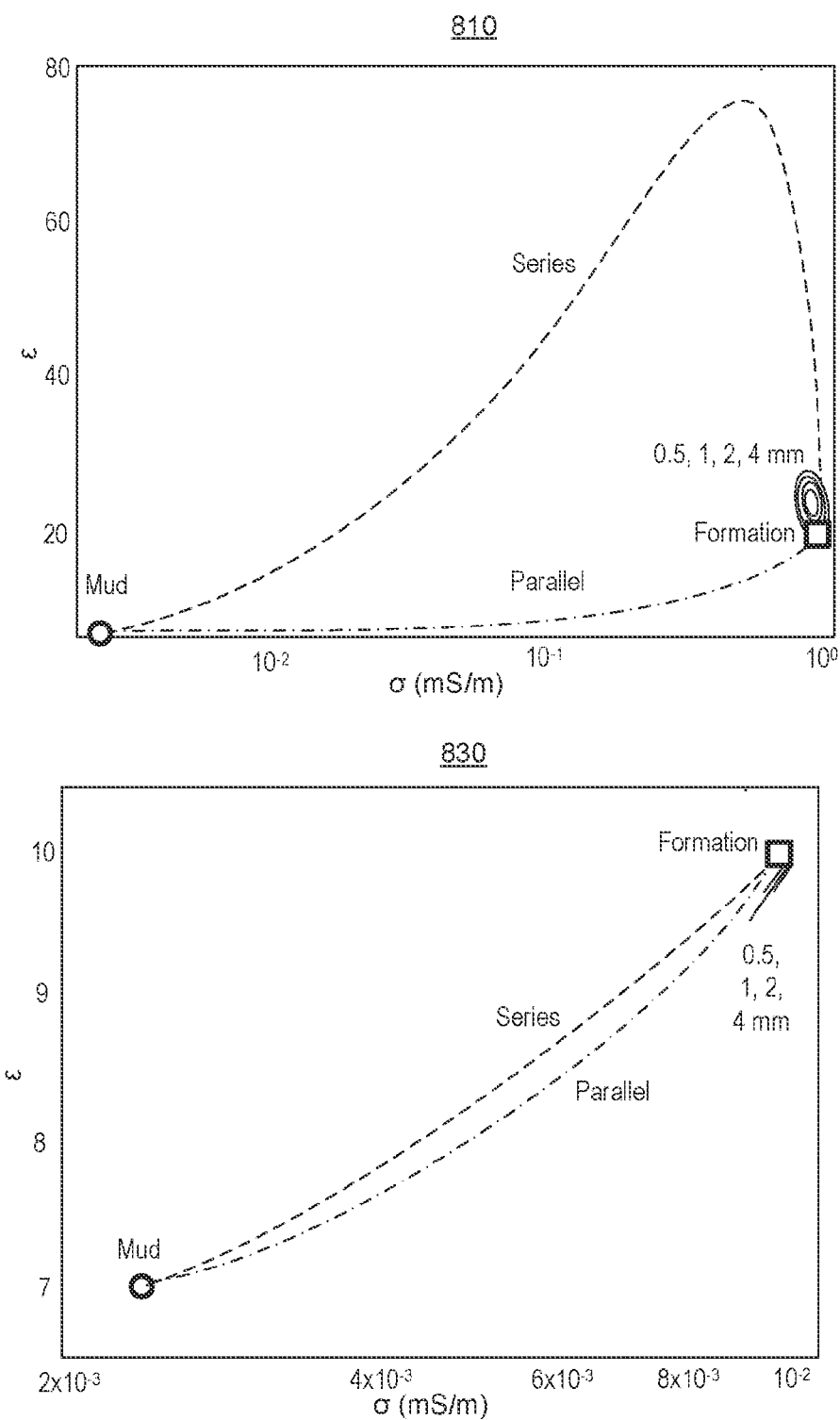
FIG. 8 illustrates examples of plots.

FIG. 8 shows example plots 810 and 830 of apparent permittivity versus conductivity for two different scenarios. In particular, equivalent impeditivities at high frequency, corrected from mud effects for two different formations and four fracture thicknesses of 0.5 mm, 1 mm, 2 mm and 4 mm are shown. In the plots 810 and 830, the x-axis is for the conductivity and the y-axis is for apparent permittivity deduced from equivalent impedances. As an example, far from a fracture, the equivalent formation impeditivity can be suitably modeled using a series model, between mud impedance (see, e.g., a circle marker labeled mud) and formation impedance (see, e.g., a square marker labeled formation). Such an electrical model remains valid at high resistivity, for example, when a button of an electrical imaging tool (e.g., electrode button) is getting closer to a fracture. However, at lower resistivity, such a simple electrical model does not hold when the button is closer to the fracture. To account for such phenomena, a parallel contribution of a fracture can be added to a model.

As an example, a response can be plotted as function of distance of tool button to fracture position to show that a fracture can be distinguished relatively to a background response, with a distinguishable increase of impeditivity level when getting closer to the fracture, when fractures are sufficiently thick.

Figure 9:
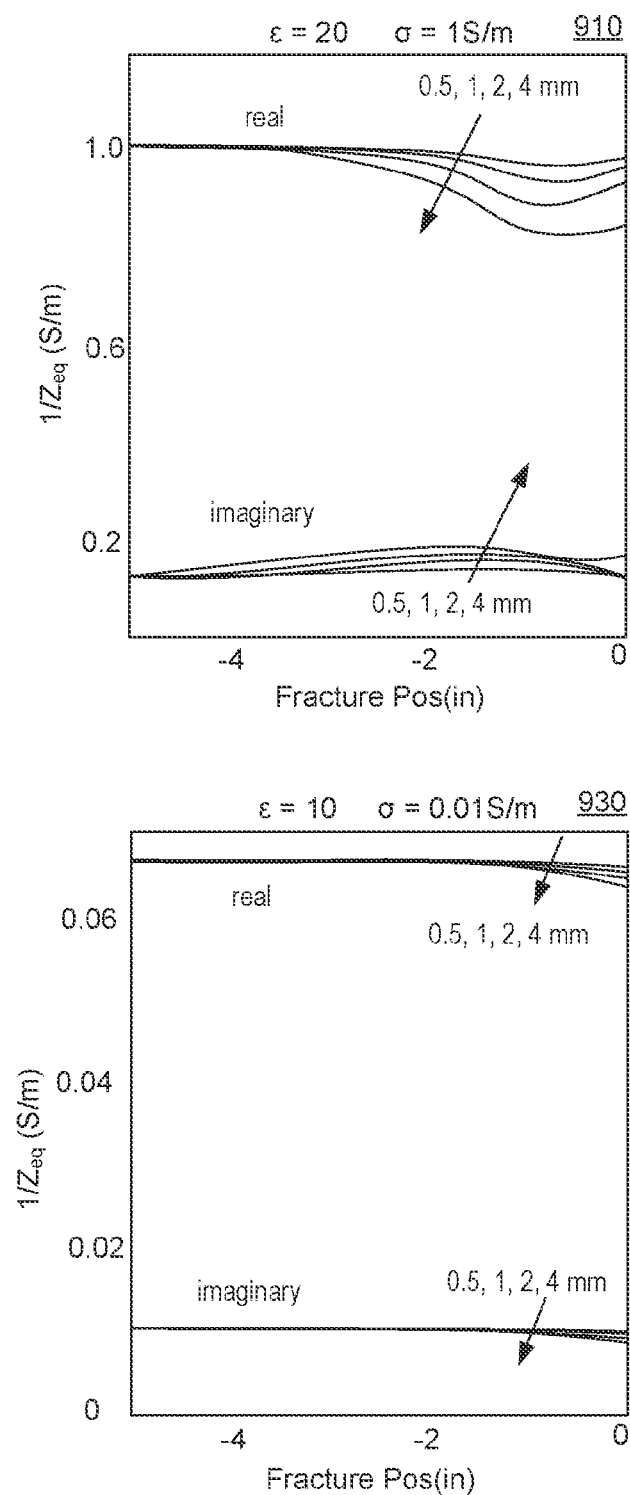
FIG. 9 illustrates examples of plots.

FIG. 9 shows example plots 910 and 930 for equivalent impeditivities as a function of fracture position and thickness for two different formation background properties ($\varepsilon=20$, $\sigma=1$ S/m and $\varepsilon=10$, $\sigma=0.01$ S/m). In the example plots 910 and 930, the fracture is modeled as being perpendicular to the borehole, with the response being on one side of the fracture, as the fracture is symmetric for the other side.

With analogy with quantification proposed on conductive fractures with WBM imagers, the quantity defined here by integration along the logging direction:

$$A = \int_{\zeta=-z_0}^{\zeta=z_0} \left| \frac{1}{z_f} - \frac{1}{z_f^{bckg}} \right| d\zeta,$$

which gives direct information on the fracture thickness when mud and background formation properties are known.

Figure 10:
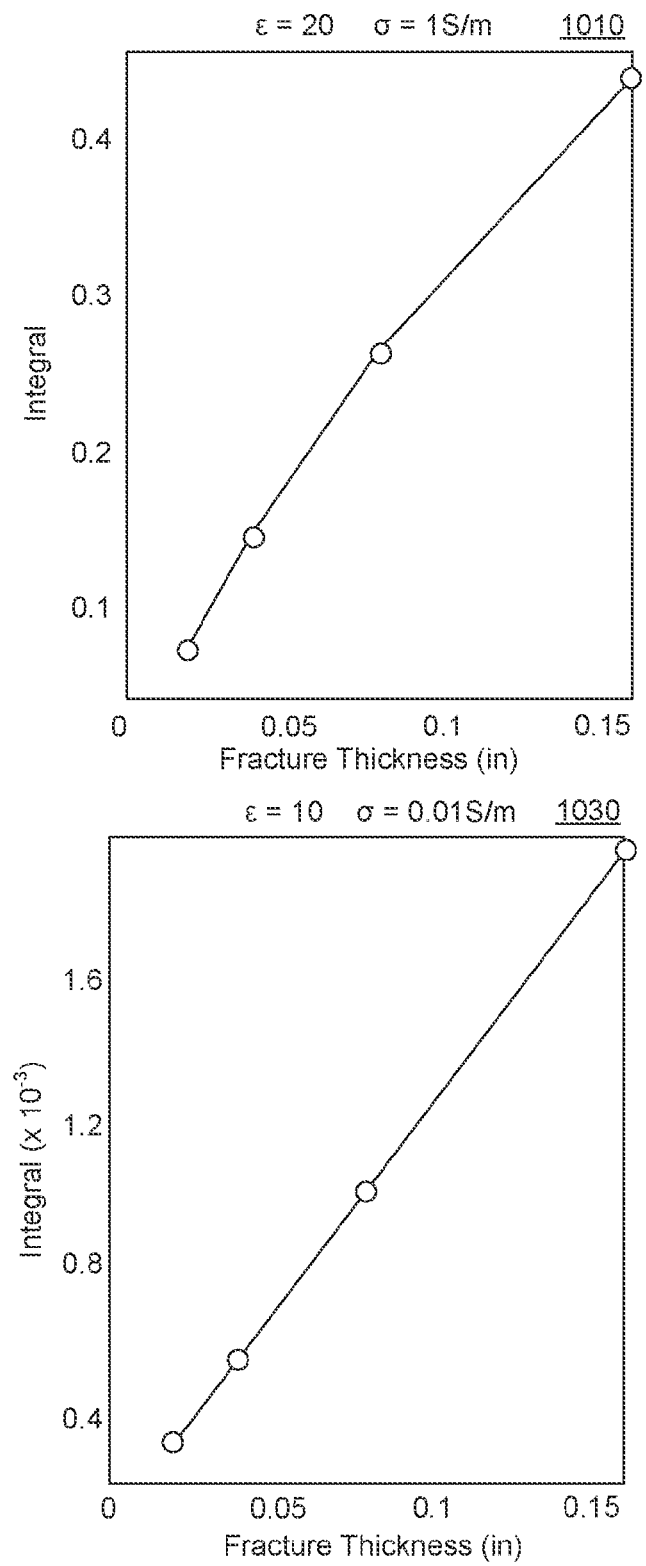
FIG. 10 illustrates examples of plots.

FIG. 10 shows example plots 1010 and 1030 of integral values versus fracture thickness in inches. The relationship between fracture thickness and the integral value tends to be mostly linear, for example, with a factor depending on the ratio between the fracture and formation impedances; noting that in the plot 1010, some slight non-linearity is shown with respect to increasing fracture thickness (th).

Similar to a water-based mud (WBM) scenario, there can be a relationship of the kind:

$$th \approx c.A.|Z_m^b \cdot Z_f^{1-b}|$$

As such, a method can be employed that can capture to a sufficient level of accuracy as the influence of impedance contrasts to this effect.

As an example, a method can be applied for one or more operating frequencies. For example, a number of tool frequencies may be utilized where data from each of the number of tool frequencies is processed. Where processing is applied at each operating frequency, a relationship can be established between current integrated current leakage in the vicinity of the fracture and its electrical characteristics and thickness.

As explained, a borehole imaging tool can operate at a frequency or frequencies that can be in a range, for example, from approximately 1 MHz to approximately 100 MHz to conduct current from the tool to a formation, which can be through an isolating layer of oil-based mud (e.g., an electrical insulator) such that current propagates from the tool through the oil-based mud and into the formation, which may or may not include a fracture, a crack, etc.

As an example, a method can include estimating mud impeditivity $Z_m$ in one or more manners, which may be from casing measurement, where available, and/or from multiple sensors radially offset, where available. Such a method can include identifying a fracture location, extent and background impeditivity (e.g., formation impeditivity). Such a method can include, for example, based on ultrasonic stand-off, computing effective formation impeditivity while crossing the fracture. Such a method can further include computing an integral of current leakage for the fracture. As an example, such a method can include one or more of testing if a dispersion of fracture impeditivity can be comparable to the mud or mud-cake impeditivity dispersion, so test if the fracture is open or closed; estimating fracture aperture from a formula, assuming it is filled with whole mud; and, for large fractures, assuming fracture thickness (e.g., from ultrasonic data) and estimating fracture impeditivity from the formula.

An article by Luthi et al., entitled "Fracture apertures from electrical borehole scans" (Geophysics, vol. 55, No. 7 (July 1990); P. 821-833), is incorporated by reference herein, which considers conductive, non-electrically insulating mud. The foregoing article describes a three-dimensional finite-element model for response to fractures of a particular borehole imaging tool that records high-resolution electrical scans of a borehole wall where an equation $W = C A R_m^b R_{x0}^1$ describes, over two orders of magnitude of resistivity contrasts between borehole mud and the formation, the relationship between fracture width W (in mm), formation sensitivity $R_{x0}$, mud resistivity $R_m$, and the additional current flow A caused by the presence of the fracture. In the foregoing equation, A is the additional current which can be injected into the formation divided by the voltage, integrated along a line perpendicular across the fracture trace. The coefficient c and exponent b can be obtained numerically from forward modeling. In the Luthi article, tool stand-offs of up to 2.5 mm and fracture dips in the range from 0° to 40° were found to have an insignificant effect on the relationship. The Luthi article includes integration over a circular area around locations to gather excessive currents where the integral is then geometrically reduced to approximate a line integral A. Resulting fracture apertures range from 10 microns to 1 mm. For wider fractures agreement as to apertures was obtained from Stoneley wave reflection measurements. Detection and characterization of fractures in wellbores had a detection threshold of around 10 microns with resolution of fractures as little as 1 cm apart, along with azimuthal orientation of fractures.

As explained, a method can provide for characterization of fractures, cracks, etc., in the presence of a fluid that is electrically insulating such as, for example, oil-based mud. In boreholes that are drilled into a formation using such electrically insulating fluid, a method can include characterizing a fracture as being one or more of a natural fracture, a cemented fracture, a drilling induced fracture, etc. For example, a drilling induced fracture may be open and not cemented such that drilling fluid can infiltrate the drilling induced fracture while a cemented fracture can be closed and not take on drilling fluid infiltration. Natural fractures may be initially in an open state or a closed state where drilling can alter a state. For example, drilling may cause a transition from a closed state to an open state. In such an example, alteration of a natural fracture may have an impact on borehole geomechanics such that the borehole may tend to be weaker at the location of the natural fracture that has become open. As mentioned, drilling induced fractures may occur, which may result in geomechanical weakening of a borehole.

As an example, a method can include quantifying an aperture of a fracture as a dimension of an opening at a borehole wall of the fracture. In such an example, the aperture can provide an indication of how much fluid may infiltrate or otherwise flow into the fracture for a given pressure when borehole pressure exceeds formation pressure. As to a cemented fracture, it can include water within cement such that the cemented fracture exhibits a relatively low resistivity, which can contrast with open fractures that take on electrically insulating oil as within an oil-based mud such that resistivity is higher. In situations where water-based mud is utilized, as may be appreciated, an open fracture that takes on water-based mud will not have a contrast with a cemented fracture akin to that of an open fracture that takes on oil-based mud (e.g., water-based mud resistivity is less than that of oil-based mud resistivity).

As an example, where a swarm of fractures is encountered in a borehole, a method can include providing information as to fracture density. For example, consider fracture density given as a number of fractures per a distance, etc.

As explained with respect to the example of FIG. 4, data acquired by a borehole imaging tool can be cylindrical surface data where a sinewave type of feature can be discerned (see, e.g., the plot 430), which may represent a plane that passes through a borehole (see, e.g., the plot 440). In such an example, while FIG. 4 refers to bedding planes, a plane can be a fracture, a crack, etc. Such cylindrical surface data and/or other related data can provide for determining a location and an orientation of a fracture, a crack, etc. For example, an angle of a borehole and/or an angle of a fracture may be determined (see, e.g., the plot 440) where an angle may be other than 90° (see, e.g., the example fracture 705 of FIG. 7). Such a determination may be utilized for one or more purposes. For example, consider assessing borehole geomechanics using fracture location and fracture orientation, optionally along with fracture characteristics such as, for example, one or more of open, closed, aperture, etc.

As an example, a model can be generated that can represent a fracture along with orientation thereof in a matrix that can be defined with a matrix resistivity (e.g., in a region away from the fracture). Such a model can be utilized to integrate the surplus of current within an area about the fracture where the surplus current can be utilized to quantify the aperture of the fracture (e.g., at the wall of a borehole). As an example, an aperture can be measured within a relatively shallow distance from a borehole wall (e.g., a few millimeters). As explained, a model can be utilized to quantify fracture apertures in the presence of oil and/or other electrically insulating fluid.

As an example, a method can include acquiring data in a cased section of a borehole and acquiring data in an open hole section of a borehole. In such an example, data from a cased section can provide for calibration and/or reference value determinations.

As an example, a method can include drilling a borehole in sections where each successive section has a smaller diameter such that borehole diameter decreases with respect to depth, which may be measured depth and/or true vertical depth. As a borehole gets deeper, pressure in an annulus filled with mud (e.g., an annulus between a drillstring and a borehole wall, whether cased and/or open) increases. As such, mud density can be adjusted to assure a proper balance between formation pressure and borehole pressure. Where the borehole pressure is too great, a risk of borehole damage exists where mud can flow into the formation. Conversely, where borehole pressure is too small, formation fluid can flow into the borehole. As an example, a method can include planning and/or controlling drilling operations, casing operations, etc., based at least in part on fracture assessment. For example, where more natural, open fractures are detected and/or where more drilling induced fractures are detected, drilling operations may become more conservative in an effort to reduce potential damage to a borehole wall, which may result in undesirable borehole instability. A borehole collapse may aim to be avoided through such a method, which, as explained, may result in stuck pipe or other complications (e.g., for drilling, completions, production, etc.).

As an example, a method can include characterizing a formation based on borehole imaging tool data acquired in a borehole that includes electrically insulating oil. In such an example, the method can include characterizing the formation according to one or more secondary permeabilities. For example, a reservoir formation may produce fluid via fractures, which have a permeability that differs from a matrix permeability of the reservoir formation. In such an example, a reservoir model suitable for use by a fluid flow simulator may utilize one or more secondary permeabilities, directly and/or indirectly, for purposes of simulating flow of fluid from the reservoir to a borehole (e.g., a completed well, etc.).

As an example, a method may be utilized to characterize a carbonate formation where a porosity model can account for geometrical variation of vugs in a carbonate layer. In such an example, vug characterization can be achieved using a borehole imaging tool. Where electrical imaging is utilized, without OBM related processing as described herein, drilling demands WBM, which as mentioned, can be detrimental to a formation (e.g., dissolving formation constituents) and/or lesser in drilling lubrication capabilities than OBM. With OBM related processing, drilling may utilize OBM and still acquire electrical imaging data that can be utilized to appropriately characterize a formation.

As an example, a borehole imaging tool can include circuitry that can perform a method to characterize a formation, which can include fracture, crack, etc., characterization. In such an example, the tool can include a processor and memory along with processor-executable instructions stored in the memory to generate information, which may then be stored and/or transmitted. As an example, a drill-string can include a number of tools that may be in communication with one another, directly and/or indirectly. In such an example, one tool may generate information that can be utilized to control another one of the tools. For example, consider control of a directional drilling tool based at least in part on information generated from a borehole imaging tool.

As explained, bandwidth for transmission of data from a downhole tool to surface can be limited (e.g., consider mud-pulse telemetry). Where bandwidth is limited, the ability to generate characterization information downhole can provide for more rapid transmission than transmitting raw data. For example, raw data can be processed downhole to meaningful information, which may then be compressed, encoded, etc., and transmitted uphole (e.g., to surface equipment) for purposes of assessment of and/or control of one or more operations. Where a downhole tool includes multiple instruments, some of which may be controllable, transmission may be from one instrument to another. For example, consider triggering measurements by one instrument based on fracture related information generated from measurements of another instrument. As an example, one or more downhole drilling parameters may be controllable, for example, consider controlling a tool face parameter for a drill bit using information generated from one or more downhole instruments. In such an example, tool face parameter control may aim to improve borehole geomechanics in the presence of a fracture, fractures, a swarm of fractures, etc.

As an example, one or more characterizations from electrical imaging tool data can be utilized in a system such as the system 200 of FIG. 2. For example, consider use in the geo data block 210, the surface models block 220, the volume models block 230, the applications block 240 (e.g., well stability assessment 246, etc.), the numerical processing block 250 and/or the operational decision block 260.

As an example, a method can include halting a section and commencing a smaller diameter section of a borehole responsive to detection of fracture characteristics that are indicative of possible borehole damage. In general, a small diameter drill bit will cause less damage than a larger diameter drill bit under such circumstances.

Figure 11:
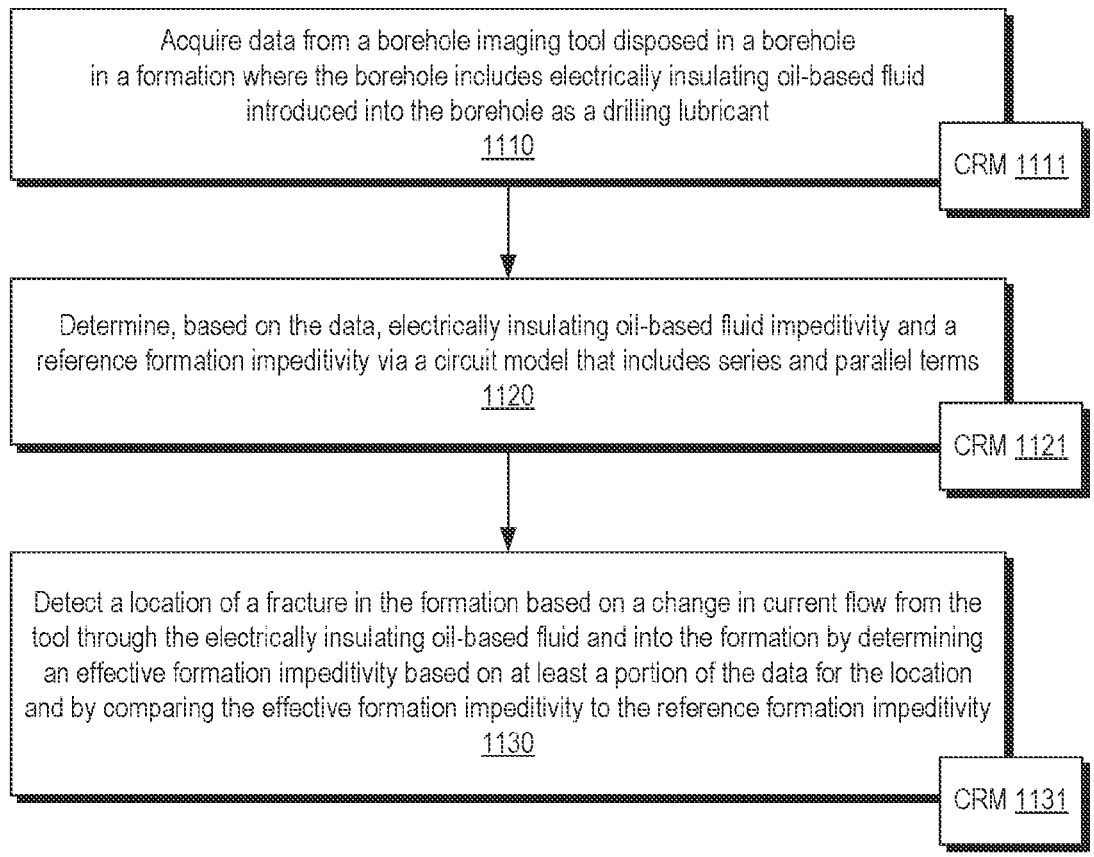
FIG. 11 illustrates an example of a method and an example of a system.
Figure 11:
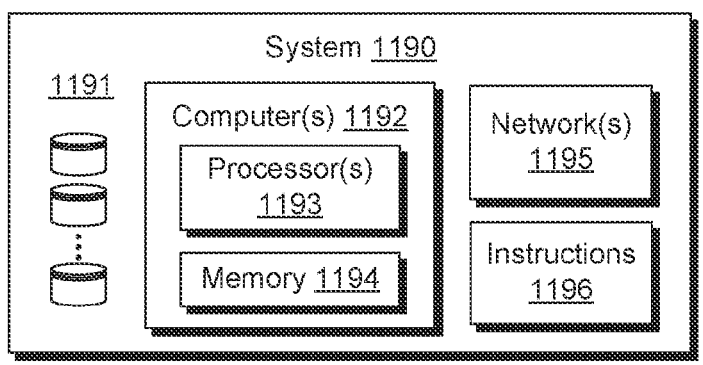

FIG. 11 shows an example of a method 1100 and an example of a system 1190. As shown, the method 1100 can include an acquisition block 1110 for acquiring data from a borehole imaging tool disposed in a borehole in a formation where the borehole includes electrically insulating oil-based fluid introduced into the borehole as a drilling lubricant; a determination block 1120 for determining, based on the data, electrically insulating oil-based fluid impeditivity and a reference formation impeditivity via a circuit model that includes series and parallel terms; and a detection block 1130 for detecting a location of a fracture in the formation based on a change in current flow from the tool through the electrically insulating oil-based fluid and into the formation by determining an effective formation impeditivity based on at least a portion of the data for the location and by comparing the effective formation impeditivity to the reference formation impeditivity.

The method 1100 is shown in FIG. 11 in association with various computer-readable media (CRM) blocks 1111, 1121 and 1131. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 1100. As an example, a computer-readable medium (CRM) may be a computer-readable storage medium that is non-transitory and that is not a carrier wave. As an example, one or more of the blocks 1111, 1121 and 1131 may be in the form processor-executable instructions.

In the example of FIG. 11, the system 1190 includes one or more information storage devices 1191, one or more computers 1192, one or more networks 1195 and instructions 1196. As to the one or more computers 1192, each computer may include one or more processors (e.g., or processing cores) 1193 and memory 1194 for storing the instructions 1196, for example, executable by at least one of the one or more processors 1193 (see, e.g., the blocks 1111, 1121 and 1131). As an example, a computer may include one or more network interfaces (e.g., wired or wireless), one or more graphics cards, a display interface (e.g., wired or wireless), etc.

As an example, a method can include acquiring data from a borehole imaging tool disposed in a borehole in a formation where the borehole includes electrically insulating oil-based fluid introduced into the borehole as a drilling lubricant; determining, based on the data, electrically insulating oil-based fluid impeditivity and a reference formation impeditivity via a circuit model that includes series and parallel terms; and detecting a location of a fracture in the formation based on a change in current flow from the tool through the electrically insulating oil-based fluid and into the formation by determining an effective formation impeditivity based on at least a portion of the data for the location and by comparing the effective formation impeditivity to the reference formation impeditivity. In such an example, the borehole imaging tool may operate at one or more frequencies in a range from approximately 1 MHz to approximately 100 MHz. For example, a tool can include circuitry that can select one or more operational frequencies in a range from 1 MHz to 100 MHz; noting that various tools may provide for narrower or wider ranges and/or range limits.

As an example, an electrically insulating oil-based fluid impeditivity can be determined from a portion of data acquired in a cased section of the borehole. In such an example, a casing can be a metallic casing that is within a borehole and disposed between a tool and a borehole wall, as formed by a formation, where, for example, cement may be disposed between an outer surface of the metallic casing and the borehole wall.

As an example, electrically insulating oil-based fluid impeditivity can be determined from a portion of data acquired by two sensors disposed at two different distances from a wall of a borehole.

As an example, a circuit model can include a first fluid impedance term and a second fluid impedance term, where the second fluid impedance term is in series with a formation impedance term. As an example, a circuit model can include one or more tool geometry parameters and a stand-off parameter.

As an example, a method can include determining thickness of a fracture by integrating a difference between a reciprocal of an effective formation impeditivity and a reciprocal of a reference formation impeditivity with respect to a distance along a borehole. In such an example, the fracture can include a portion of electrically insulating oil-based fluid, which may be an oil-based mud utilized for drilling at least a portion of the borehole. As mentioned, a method may provide for fracture detection and/or characterization in one or more types of media where a tool can be inserted into a borehole in a medium (e.g., a matrix, a formation, etc.).

As an example, a method can include determining an orientation of a fracture with respect to a borehole. As an example, a method can include determining whether a fracture is open or closed. For example, a method can include determining whether a fracture is open or closed by comparing a dispersion of fracture impeditivity to a dispersion of electrically insulating oil-based fluid impeditivity.

As an example, a method can include classifying a fracture as a natural fracture or a drilling induced fracture. In such an example, the method can further include classifying the natural fracture as a cemented fracture or a fracture that includes a portion of electrically insulating oil-based fluid.

As an example, a borehole imaging tool can include an electrically resistivity unit and an ultrasonic unit. In such an example, acquired data can include ultrasonic measurement data, where a method can include determining a stand-off of the borehole imaging tool with respect to a wall of a borehole based on the ultrasonic measurement data.

As an example, a borehole imaging tool can include a processor that can perform various tasks such as, for example, determining and detecting tasks.

As an example, a borehole imaging tool can include memory that stores information indicative of a location of a fracture. In such an example, the information may be transmitted to another downhole tool and/or to uphole equipment and/or, for example, the memory may be read once the borehole imaging tool is pulled out of a borehole using appropriate equipment.

As an example, a method can include, based on a determined location of a fracture by a borehole imaging tool disposed in a borehole, issuing a control signal to drilling equipment that performs drilling to extend the borehole.

As an example, a system can include a processor; memory accessible to the processor; and processor-executable instructions stored in the memory to instruct the system to: acquire data from a borehole imaging tool disposed in a borehole in a formation where the borehole includes electrically insulating oil-based fluid introduced into the borehole as a drilling lubricant; determine, based on the data, electrically insulating oil-based fluid impeditivity and a reference formation impeditivity via a circuit model that includes series and parallel terms; and detect a location of a fracture in the formation based on a change in current flow from the tool through the electrically insulating oil-based fluid and into the formation by determination of an effective formation impeditivity based on at least a portion of the data for the location and by comparison of the effective formation impeditivity to the reference formation impeditivity. In such an example, the processor and the memory may be part of the borehole imaging tool. As an example, a system can include an electrical imaging unit and, additionally, an ultrasonic imaging unit.

As an example, one or more non-transitory computer-readable storage media can include processor-executable instructions to instruct a computing system to: acquire data from a borehole imaging tool disposed in a borehole in a formation wherein the borehole includes electrically insulating oil-based fluid introduced into the borehole as a drilling lubricant; determine, based on the data, electrically insulating oil-based fluid impeditivity and a reference formation impeditivity via a circuit model that includes series and parallel terms; and detect a location of a fracture in the formation based on a change in current flow from the tool through the electrically insulating oil-based fluid and into the formation by determination of an effective formation impeditivity based on at least a portion of the data for the location and by comparison of the effective formation impeditivity to the reference formation impeditivity. In such an example, the circuit model can include a first fluid impedance term and a second fluid impedance term, where the second fluid impedance term is in series with a formation impedance term. For example, in the equivalent circuit 500 of FIG. 5, which can be a circuit model or part of a circuit model, the term $Z_{mud1}$ is in series with the term $Z_{form}$, while the term $Z_{mud2}$ is in parallel with the in series terms $Z_{mud1}$ and $Z_{form}$. While the notation of FIG. 5 utilizes "1" and "2", the term $Z_{mud1}$ can be referred to as a second fluid impedance and the term $Z_{mud2}$ can be referred to as a first fluid impedance. As explained, a circuit model can include one or more tool geometry parameters and a stand-off parameter.

As an example, a computer program product can include one or more computer-readable storage media that can include processor-executable instructions to instruct a computing system to perform one or more methods and/or one or more portions of a method.

Figure 12:
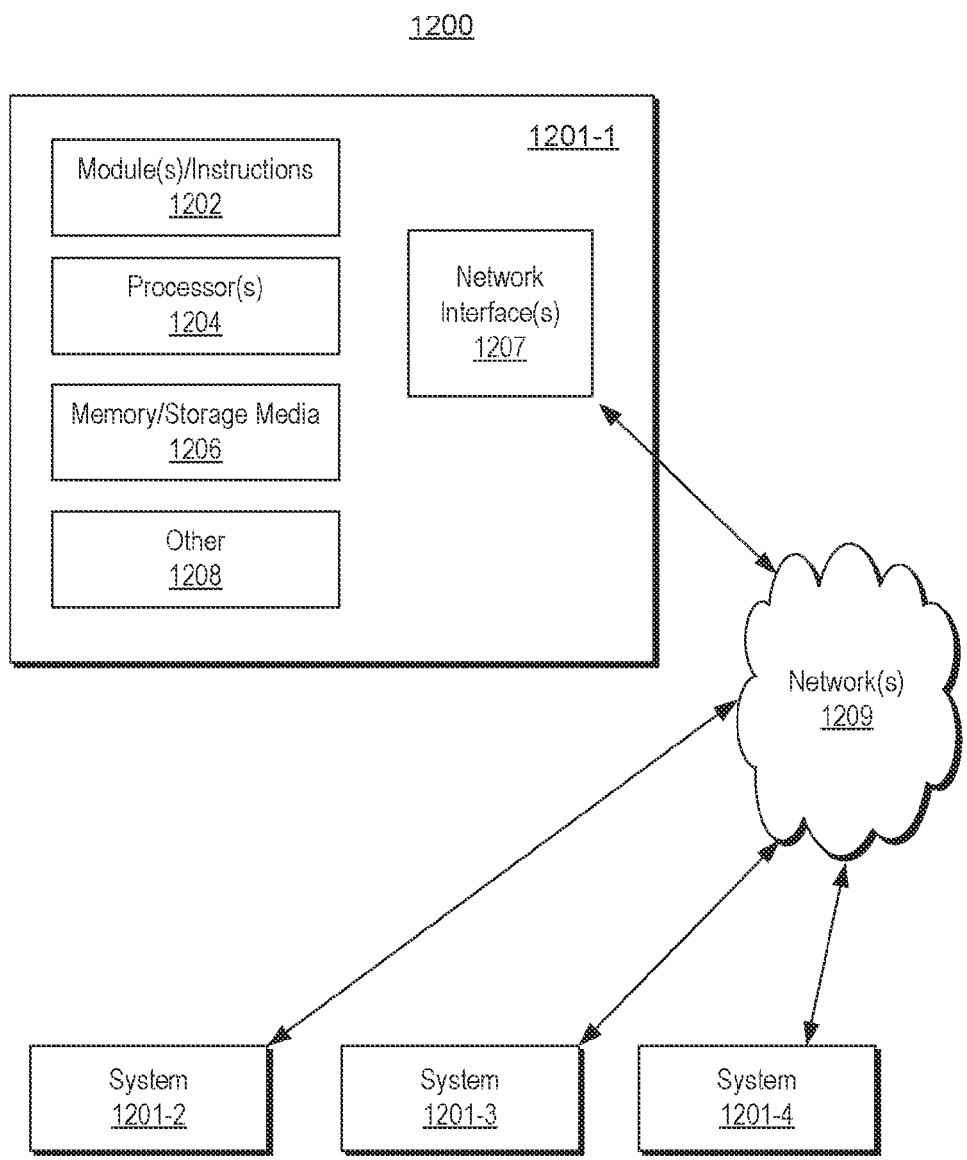
FIG. 12 illustrates examples of computer and network equipment.

In some embodiments, a method or methods may be executed by a computing system. FIG. 12 shows an example of a system 1200 that can include one or more computing systems 1201-1, 1201-2, 1201-3 and 1201-4, which may be operatively coupled via one or more networks 1209, which may include wired and/or wireless networks.

As an example, a system can include an individual computer system or an arrangement of distributed computer systems. In the example of FIG. 12, the computer system 1201-1 can include one or more modules 1202, which may be or include processor-executable instructions, for example, executable to perform various tasks (e.g., receiving information, requesting information, processing information, simulation, outputting information, etc.).

As an example, a module may be executed independently, or in coordination with, one or more processors 1204, which is (or are) operatively coupled to one or more storage media 1206 (e.g., via wire, wirelessly, etc.). As an example, one or more of the one or more processors 1204 can be operatively coupled to at least one of one or more network interface 1207. In such an example, the computer system 1201-1 can transmit and/or receive information, for example, via the one or more networks 1209 (e.g., consider one or more of the Internet, a private network, a cellular network, a satellite network, etc.). As shown, one or more other components 1208 can be included in a computer system such as the computer system 1201-1.

As an example, the computer system 1201-1 may receive from and/or transmit information to one or more other devices, which may be or include, for example, one or more of the computer systems 1201-2, etc. A device may be located in a physical location that differs from that of the computer system 1201-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1206 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in machine running machine-readable instructions or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICS, FPGAs, PLDs, or other appropriate devices.

Figure 13:
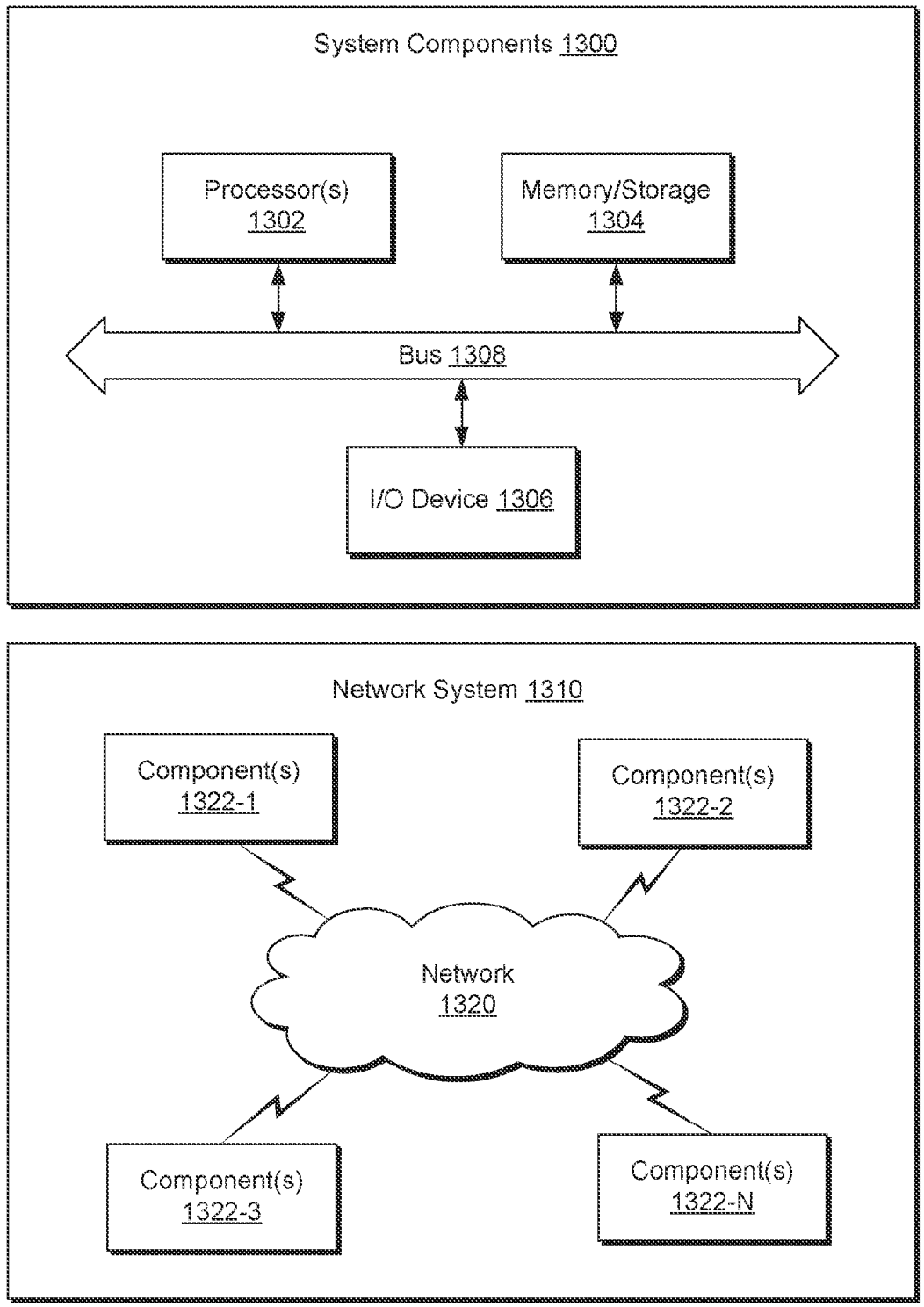
FIG. 13 illustrates example components of a system and a networked system.

FIG. 13 shows components of an example of a computing system 1300 and an example of a networked system 1310 with a network 1320. As an example, the digital microscopy system 400 of FIG. 4 or another digital microscopy system can include various features of the system 1300 and/or the system 1310 of FIG. 13 and/or be operatively coupled to one or more instances of the system 1300 and/or the system 1310 of FIG. 13.

In FIG. 13, the system 1300 includes one or more processors 1302, memory and/or storage components 1304, one or more input and/or output devices 1306 and a bus 1308. In an example embodiment, instructions may be stored in one or more computer-readable media (e.g., memory/storage components 1304). Such instructions may be read by one or more processors (e.g., the processor(s) 1302) via a communication bus (e.g., the bus 1308), which may be wired or wireless. The one or more processors may execute such instructions to implement (wholly or in part) one or more attributes (e.g., as part of a method). A user may view output from and interact with a process via an I/O device (e.g., the device 1306). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1310. The network system 1310 includes components 1322-1, 1322-2, 1322-3, . . . 1322-N. For example, the components 1322-1 may include the processor(s) 1302 while the component(s) 1322-3 may include memory accessible by the processor(s) 1302. Further, the component(s) 1322-2 may include an I/O device for display and optionally interaction with a method. The network 1320 may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
 acquiring data from a borehole imaging tool disposed in a borehole in a formation wherein the borehole includes electrically insulating oil-based fluid introduced into the borehole as a drilling lubricant;
 determining, based on the data, electrically insulating oil-based fluid impedivity and a reference formation impedivity via a circuit model that includes series and parallel terms; and
 detecting a location of a fracture in the formation based on a change in current flow from the tool through the electrically insulating oil-based fluid and into the formation by determining an effective formation impedivity based on at least a portion of the data for the location and by comparing the effective formation impedivity to the reference formation impedivity.

2. The method of claim 1, wherein the borehole imaging tool operates at a frequency in a range from 1 MHz to 100 MHz.

3. The method of claim 1, wherein the electrically insulating oil-based fluid impedivity is determined from a portion of the data acquired in a cased section of the borehole.

4. The method of claim 1, wherein the electrically insulating oil-based fluid impedivity is determined from a portion of the data acquired by two sensors disposed at two different distances from a wall of the borehole.

5. The method of claim 1, wherein the circuit model includes a first fluid impedance term and a second fluid impedance term, wherein the second fluid impedance term is in series with a formation impedance term.

6. The method of claim 1, wherein the circuit model comprises one or more tool geometry parameters and a stand-off parameter.

7. The method of claim 1, further comprising determining thickness of the fracture by integrating a difference between a reciprocal of the effective formation impedivity and a reciprocal of the reference formation impedivity with respect to a distance along the borehole, wherein the fracture includes a portion of the electrically insulating oil-based fluid.

8. The method of claim 1, further comprising determining an orientation of the fracture with respect to the borehole.

9. The method of claim 1, further comprising determining whether the fracture is open or closed, wherein determining comprises comparing a dispersion of fracture impedivity to a dispersion of electrically insulating oil-based fluid impedivity.

10. The method of claim 1, further comprising classifying the fracture as a natural fracture or a drilling induced fracture.

11. The method of claim 10, further comprising classifying the natural fracture as a cemented fracture or a fracture that includes a portion of the electrically insulating oil-based fluid.

12. The method of claim 1, wherein the borehole imaging tool comprises an electrically resistivity unit and an ultrasonic unit, wherein the data comprise ultrasonic measurement data, and the method further comprises determining a stand-off of the borehole imaging tool with respect to a wall of the borehole based on the ultrasonic measurement data.

13. The method of claim 1, wherein the borehole imaging tool comprises a processor that performs the determining and the detecting and wherein the borehole imaging tool comprises memory that stores information indicative of the location of the fracture.

14. The method of claim 1, further comprising, based on the location of the fracture, issuing a control signal to drilling equipment that performs drilling to extend the borehole.

15. A system comprising:
a processor;
memory accessible to the processor; and
processor-executable instructions stored in the memory to instruct the system to:
acquire data from a borehole imaging tool disposed in a borehole in a formation wherein the borehole includes electrically insulating oil-based fluid introduced into the borehole as a drilling lubricant;
determine, based on the data, electrically insulating oil-based fluid impedivity and a reference formation impedivity via a circuit model that includes series and parallel terms; and
detect a location of a fracture in the formation based on a change in current flow from the tool through the electrically insulating oil-based fluid and into the formation by determination of an effective formation impedivity based on at least a portion of the data for the location and by comparison of the effective formation impedivity to the reference formation impedivity.

16. The system of claim 15, wherein the processor and the memory are part of the borehole imaging tool.

17. The system of claim 16, further comprising an electrical imaging unit and an ultrasonic imaging unit.

18. One or more non-transitory computer-readable storage media comprising processor-executable instructions to instruct a computing system to:
acquire data from a borehole imaging tool disposed in a borehole in a formation wherein the borehole includes electrically insulating oil-based fluid introduced into the borehole as a drilling lubricant;
determine, based on the data, electrically insulating oil-based fluid impedivity and a reference formation impedivity via a circuit model that includes series and parallel terms; and
detect a location of a fracture in the formation based on a change in current flow from the tool through the electrically insulating oil-based fluid and into the formation by determination of an effective formation impedivity based on at least a portion of the data for the location and by comparison of the effective formation impedivity to the reference formation impedivity.

19. The one or more non-transitory computer-readable media of claim 18, wherein the circuit model includes a first fluid impedance term and a second fluid impedance term, wherein the second fluid impedance term is in series with a formation impedance term.

20. The one or more non-transitory computer-readable media of claim 18, wherein the circuit model comprises tool geometry parameters and a stand-off parameter.

* * * * *